United States Patent [19]
Cuk et al.

[11] Patent Number: 5,570,276
[45] Date of Patent: Oct. 29, 1996

[54] SWITCHING CONVERTER WITH OPEN-LOOP INPUT VOLTAGE REGULATION ON PRIMARY SIDE AND CLOSED-LOOP LOAD REGULATION ON SECONDARY SIDE

[75] Inventors: Slobodan Cuk, Laguna Hills; Zhe Zhang, Margarita, both of Calif.

[73] Assignee: Optimun Power Conversion, Inc., Irvine, Calif.

[21] Appl. No.: 153,132

[22] Filed: Nov. 15, 1993

[51] Int. Cl.$^6$ .................................................. H02M 3/335
[52] U.S. Cl. ............................. 363/16; 363/97; 323/266
[58] Field of Search ................................. 323/222, 224, 323/265, 266, 282, 299; 363/15, 16, 95, 97

[56] References Cited

U.S. PATENT DOCUMENTS

| | | | |
|---|---|---|---|
| 4,184,197 | 1/1980 | Cuk et al. | 363/16 |
| 4,257,087 | 3/1981 | Cuk | 363/16 |
| 4,975,819 | 12/1990 | Lannuzel | 363/16 |
| 5,036,269 | 6/1991 | Murari et al. | 323/266 |
| 5,132,606 | 7/1992 | Herbert | 323/266 |
| 5,206,800 | 4/1993 | Smith | 363/21 |

OTHER PUBLICATIONS

B. Manano, "Isolating the Control Loop," Unitrode Switching Power Supply Design Seminar Manual, Dec. 1991 Edition.

S. Cuk, R. Middlebrook, "A General Unified Approach to Modeling Switching DC–to–DC Converters in Discontinuous Conduction Mode," Proceedings of IEEE PESC Conference, Jun. 1977.

L. Dixon, Jr., "Pulse Width Modulator Control Methods with Complementary Optimization," Power Conversion International Magazine, Jan. 1982.

A. Dauhajre and R. D. Middlebrook, "A Simple PWM–FM Control for Independently Regulated Dual Output Converter," Proc. Tenth International Solid State Power Electronics Conference (Powercon 10) Mar., 1993.

R. Mahadevan et al., "A Converter with Three Switched Networks Improves Regulation, Dynamics and Control," Proc. Tenth International Solid–State Power Electronics Conference (Powercon 10), Mar. 1993.

Z. Zhang, et al., "A High Efficiency 1.8kW Battery Equalizer," Proc. of 1983 Applied Power Electronics Conference, San Diego, Mar. 6–11, 1983.

*Primary Examiner*—Jeffrey L. Sterrett
*Attorney, Agent, or Firm*—A. M. Fernandez

[57] ABSTRACT

An isolated switching dc-to-dc converter is provided with a novel open-loop input voltage regulation on the primary side and the full regulation and independent protection of each of multiple outputs on the secondary side using an auxiliary circuit comprising a current bidirectional switch $Q_a$ and a capacitor $C_a$ on the primary side in a series circuit connected in parallel with a main current bidirectional switch Q to assure a continuous conduction mode for operation of the primary boost-like converter, and consequently preserves the simplicity of open-loop input voltage regulation for all loads from no load to full load. The auxiliary switch $Q_a$ is very efficient with only a fraction (5% or less) of the losses of the main active switch Q. The ideal dynamic response approaching theoretical limits is achieved for both line and load transients together with a high efficiency (85%) and record power density (20 W per cubic inch) for multiple output converters. Finally, the whole power supply needs isolation only at the main power transformer, since the need for isolation in the open-loop input and closed-loop output regulation control and drive circuitry is completely eliminated.

17 Claims, 20 Drawing Sheets

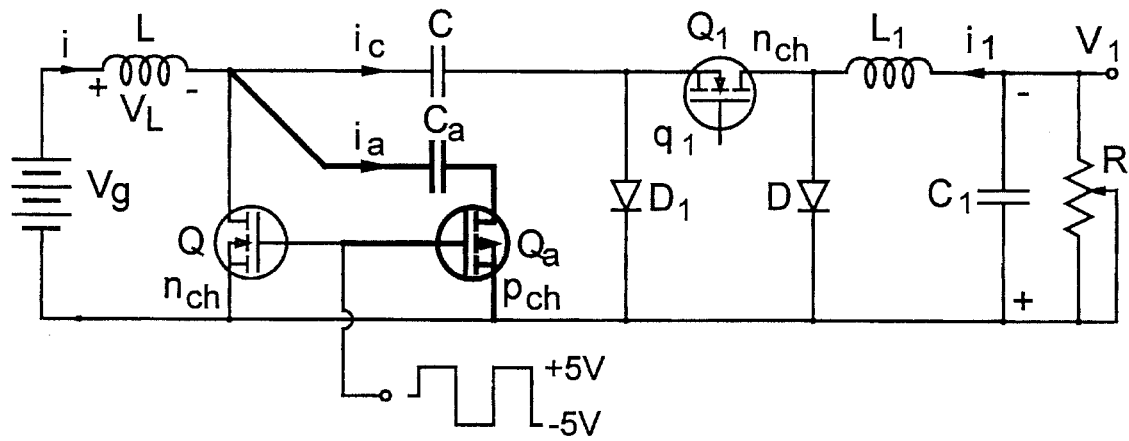
FIG. 11a
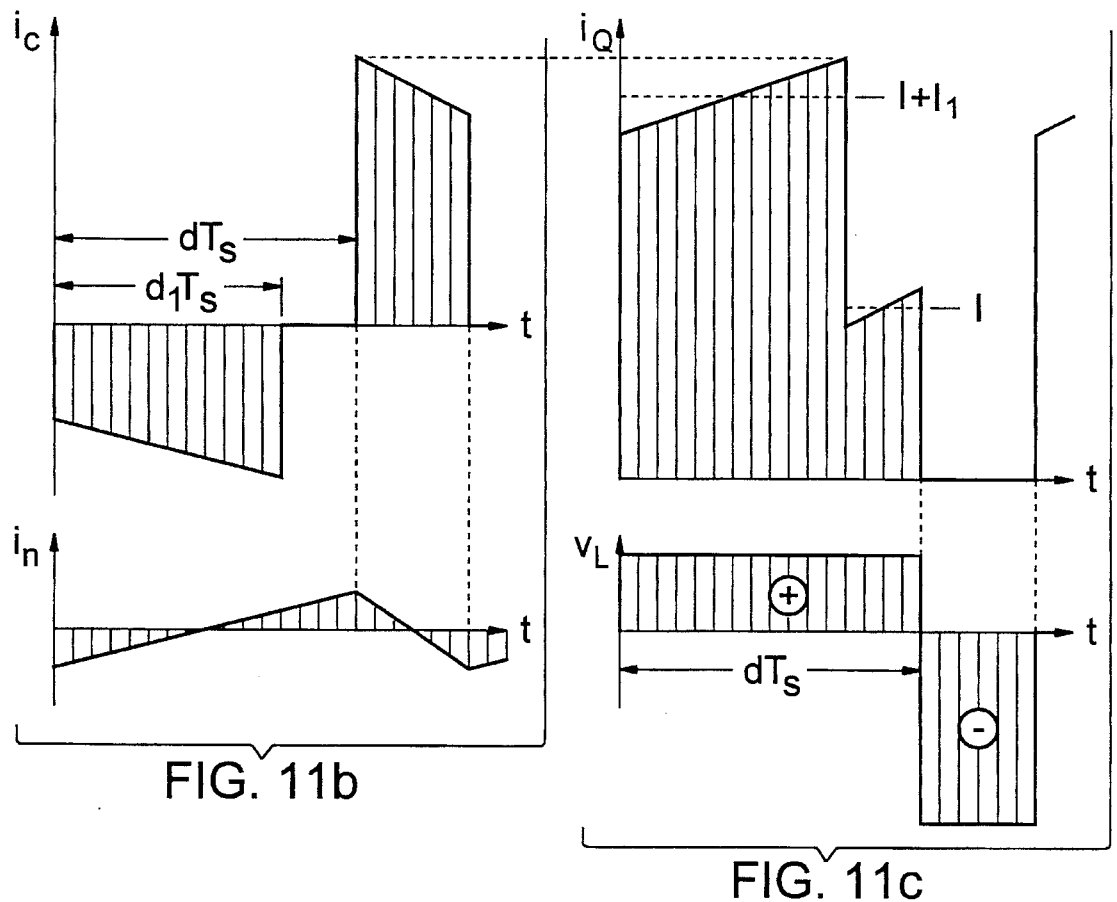
FIG. 11b
FIG. 11c

SYNCHRONOUS RECTIFIER EXTENSION $$V_1 = \frac{N_1}{N} \frac{d_1}{1-d} V_g$$

$$V_2 = \frac{N_2}{N} \frac{d_2}{1-d} V_g$$

SWITCHING CONVERTER WITH OPEN-LOOP INPUT VOLTAGE REGULATION ON PRIMARY SIDE AND CLOSED-LOOP LOAD REGULATION ON SECONDARY SIDE

FIELD OF THE INVENTION

This invention relates to dc-to-dc switching converters having an isolation transformer with full regulation and independent protection of multiple output voltages.

BACKGROUND ART

A typical isolated switching regulator, such as the forward converter of FIG. 1, has a single controllable switch on the primary side, while the controlling quantity, the desired regulated output voltage V1 of the main output is on the secondary side. This requires at least one crossing of the isolation barrier in the feedback circuitry. However, in practice, due to the additional requirements for floating drives, remote sensing etc., the feedback control and drive circuit contains typically five or more isolation transformer and/or optocouplers. Thus, it would be very beneficial to have the switching converter with a minimum number of isolation barrier crossings, and ideally only one in the main power transformer and none in the feedback control and drive circuitry. A number of feedback control methods with varying number of isolation crossings in the feedback path are discussed at length by Bob Mamano in *Isolating the Control Loop,* Unitrode Switching Power Supply Design Seminar Manual, 1991 edition. Thus, one objective of this invention is to create an isolated switching converter which completely eliminates the need for crossing the isolation barrier in the feedback control path and reduce the safety considerations just to the power transformer alone. Another objective is to realize this with simple and inexpensive control circuits.

A typical switching regulator, such as the forward converter of FIG. 1, is required to maintain the regulated output voltage despite the wide changes in the input voltage and wide load current changes. Of the two disturbances, input voltage variations have a much more significant effect on the duty ratio of the single controllable device, active switch Q on the primary side. For example, a 4 to 1 input voltage change (15 V to 60 V for example) may cause a change of duty ratio from 0.2 to 0.8 (or 4 times) in the forward converter due to its linear dc gain characteristic. On the other hand, a load change of 10 times (from 10% load to full load) causes only a fraction of the change of duty ratio, such as 0.05 or less as long as the converter remains in Continuous Inductor Current Mode (CICM). The small change in duty ratio is to just make a small adjustment in output voltage due to the voltage drop in resistive parasitic losses of the converter. Thus, for a 90% efficient converter, the duty ratio may experience only a 0.05 change, or an order of magnitude smaller change than for input voltage variations. Therefore, the separation of the two disturbances is one objective of the present invention, which also leads to other advantages explained below. The lack of such a separation leads to relatively poor transient response with large overshoot and oscillatory ringing of the output voltage due to the sudden step changes of the input voltage. Due to the limited bandwidth of the closed-loop regulator and wide range of duty ratio changes required, the output voltage can not be instantaneously updated to new steady-state voltage, but instead undergoes the oscillatory transients. This is clearly undesirable performance for most loads and should be either eliminated or minimized.

A dual output extension of the forward converter in FIG. 1 illustrates another drawback associated with the prior-art switching converters. When the load on the main output is so low (light load condition), such that the output inductor peak to peak ripple current is larger than twice the dc load current, the converter enters in a so-called Discontinuous Inductor Current Mode (DICM) of operation, in which the voltage gain is not only function of duty ratio, but also depends on the dc load current, inductance values, and switching frequency as described in Slobodan Cuk and R. D. Middlebrook, "A General Unified Approach to Modeling Switching DC-to-DC Converters in Discontinuous Conduction Mode", *Proceedings of IEEE PESC Conference,* June 1977. Although, the main output would be still regulated at its prescribed value, the duty ratio would change to accommodate this mode of operation. As a consequence the secondary output voltage would have decreased substantially from its nominal value. Similarly, when the second output enters the DICM mode, its voltage would increase. As a result, the nominal 12 V output could vary anywhere between 6 V and 18 V, which is unacceptable in practice. The brute force solution is to pre-load each output with some resistance, which is wasteful. Another solution shown in FIG. 1 is to add another buck switching regulator. Although more efficient, this adds to the size, weight and cost of the power supply and is generally not practiced except in extreme circumstances. The input power is still processed twice for the second output (cascade connection of forward and buck converters) still resulting in sizable efficiency degradation. For example, with 90% efficiency of each stage, the overall efficiency would be only 81%. Thus, another objective of this invention is to achieve the full regulation of all output voltages in a single power conversion stage with multiple outputs, but still preserve full regulation of all outputs from full load through light load to no load conditions as well as have independent protection of each output.

Output voltage regulation against variation of two quantities, that is input voltage variation and output load variation, is typically achieved using single feedback loop such as shown in FIG. 1. As a consequence, the response to the input voltage variations, especially over wide input range voltage, results in a transient in the output voltage with sizable overshoot and oscillations. One attempt to improve such response is to add feedforward compensation to the buck converter by modulating the slope of the otherwise fixed up-going ramp reference signal with the input voltage as shown in FIG. 2a. Thus, the range of duty cycle change is reduced and transient response to input voltage change improved. Due to the linearity of the buck converter dc gain characteristic and its simple two pole, minimum phase frequency response, this feed-forward control results in virtual elimination of the transient due to input voltage change, but only in the Continuous Inductor Current Mode (CICM) as seen in FIG. 2b. As soon as the converter enters DICM mode at light load and no load, the feed-forward control is ineffective and results in undesirable output voltage transients as shown in FIG. 2c. These feedforward advantages in CICM mode of operation are not limited to the buck converter. Despite, the non-linear dc gain characteristics of the boost and flyback converters, the similar advantages of improved input voltage transient response can be obtained by use of an appropriate optimum feedforward strategy, such as described in Lloyd Dixon, Jr. "Pulse Width Modulator Control Methods With Complementary Optimization", *Power Conversion International Magazine*, January 1982. However, as pointed by Dixon, once again, all advantages are lost at light load, when the converter enters DICM mode. In addition, as pointed in Dixon, the very unfavorable frequency response of the control to output transfer function of the flyback converter, having a non-minimum phase response and right half-plane zero, is not eliminated by this feedforward control, and is therefore plaguing this approach even in the CICM mode of operation. This is clearly the consequence of the fact that feedforward is always used in addition to and combined with the regular output voltage feedback control. Thus, regulation against the input voltage changes is even in this optimum feedforward control achieved via closed-loop output voltage feedback control with all limitations it imposes. Thus, one motivation of the present invention is to find a suitable switching converter configuration to regulate against input voltage changes in an open-loop fashion, which would entirely by-pass potential stability and oscillation problems as well as provide for an instantaneous and direct adjustment of the steady-state duty ratio in response to the sudden input voltage changes. The feedforward control of FIG. 2 still operates with two variations, that is input voltage variations and output load current variations still coupled through a single feedback loop and complex dynamics of the converter. Thus, another objective is to create a switching converter in which the input voltage variations are decoupled from the load current variations so that the ideal transient response of FIG. 2b for input voltage variations would be obtained for all load conditions from full load to no load, that is regardless of the conduction mode of operation together with the improved frequency response for both step input voltage and step load current changes.

Another deficiency of the switching converters is in high order dynamics and consequent complex and undesirable frequency response. For example, the switching converter disclosed in U.S. Pat. No. 4,184,197 and shown in FIG. 3 in its isolated configuration, exhibits at least a fourth order, non-minimum phase response shown in FIG. 4 due to the presence of the right half-plane (RHP) zero's in its loop-gain characteristic. This results in the 540% phase shift right after the first set of poles and zero's and results in difficulty in closing feedback loop without either damping or additional feedback control loop such as current-mode programming in which input switch current is used as a second feedback variable. Furthermore, the pole's and zero's are highly dependent on the steady-state duty ratio D, which varies over wide range for wide input voltage changes. Consequently, the feedback loop must be closed at lower frequency in order to insure operation under worst case condition and thus resulting in a sub-optimal bandwidth: typically 1 kHz for a 150 kHz switching frequency. Therefore, it would be very desirable to have a switching converter which exhibits an effective second order minimum phase response (no RHP zero's) loop-gain frequency response with a loop-gain bandwidth approaching the theoretical limit of one half the switching frequency, that is, 60 kHz bandwidth for 150 kHz switching frequency. This would then result in a small voltage overshoot with a fast settling time for step-load current changes even with a relatively small value of the output filtering capacitance. At present, a large output capacitor is used in order to reduce large output voltage overshoot due to step-load current change. Yet another objective is to provide the switching converter with the widest possible bandwidth for the load current regulation.

Several approaches have been proposed in the past which provided no-load to full-load regulation on all outputs in a single power conversion stage. The first approach described in A. Dauhajre and R. D. Middlebrook, "A Simple PWM-FM Control for Independently Regulated Dual Output Converter", Proc. Tenth International Solid State Power Electronics Conference (Powercon 10), March 1993, was based on a two-output flyback converter with one output operated in DICM mode, hence sensitive to switching frequency. The full regulation of two outputs was provided by controlling two quantities, duty ratio and the switching frequency of the single active device on the primary side. This method was clearly limited to the two outputs, required isolation in the feedback control circuit and operated at variable switching frequency, which is undesirable from Electromagnetic Interference (EMI) noise standpoint.

Another approach which achieves full regulation of all outputs but with a constant switching frequency is a Three-Switched Network converter shown in FIG. 5 and proposed by R. Mahadevan, S. El-Hamamsy, W. M. Polivka and S. Cuk in "A Converter With Three Switched Networks Improves Regulation, Dynamics, and Control", Proc. Tenth International Solid-State Power Electronics Conference (Powercon 10), March 1983. In this approach, the additional active switches $Q_1,D_1$ and $Q_2$, D are added in each of the secondary circuits of a dual output isolated Three-Switched Network converter. For simplicity and noise reasons, all switches are synchronized and turned-ON at the same instant. If all active switches are also turned-OFF at the same instant, leading to identical duty ratios of all active switches, the circuit operation clearly reduces to that of the switching Cuk converter of FIG. 3. However, when the secondary side active switches are turned-OFF before the primary side active switch is turned-OFF, the resulting different duty ratios provide a means for an independent control of each of the outputs. Each of the two output voltages can be independently and fully controlled by separate PWM control signals $q_1$ and $q_2$.

In FIG. 5a, the arrows on the two drive waveforms $q_1$ and $q_2$ indicate that these edges are controllable. Note the wide range of change of both duty ratios $d_1$ and $d_2$. However, in the control strategy proposed in, R. Mahadevan, S. El-Hamamsy, W. M. Polivka and S. Cuk, "A Converter with Three Switched Networks Improves Regulation, Dynamics and Control," Proc. Powercom 10, 1983, the duty ratio d of the primary side transistor Q was constant, and its ability to vary was not utilized. Hence, both input voltage and load current variations are compensated by controlling only the duty ratios of active switches $Q_1$ and $Q_2$ on the secondary side of the transformer. Thus, the same dynamic response deficiencies and sub-optimal frequency response to either input voltage transient or step-load current transient remains. This is clearly the consequence of the complex fourth order frequency response which is further complicated by the presence of the undesirable right half-plane (RHP) zeros leading to the non-minimum phase response and potential stability problems. Moreover, wide input voltage range leads to large variation in the duty ratio and operating point and consequent heavily compromised bandwidth to insure stability under all operating conditions. Although not exposed to Mahadevan et al., the key advantage of the switching converter of FIG. 5 is that it obviates the need for isolation in the feedback control circuitry which was neither realized nor utilized in Mahadevan et al.

SUMMARY OF THE INVENTION

The primary objective of the present invention is to provide an isolated switching converter with two separate controls; the primary non-isolated, open-loop control which regulates against input voltage changes and secondary non-isolated, closed-loop control which regulates primarily against load current changes and secondarily provides additional regulation against input voltage changes.

Another objective of the present invention is to provide this performance over all load currents from full load to no load.

Another object is to eliminate crossing the isolated barrier in the feedback control circuit.

Yet another objective is to provide improved frequency responses for both input voltage transient as well as step-load current transients for all load current conditions and to achieve an effective second order loop gain characteristic with large stability phase margin.

Yet another objective is to provide full regulation of all outputs from no load to full load as well as independent protection of each output.

Another objective of the present invention is to provide combined-open-loop and closed loop regulation of the input voltage by a nonisolated control circuit on the primary side.

These and other objects of the invention are achieved in an isolated switching regulator comprising an isolated power processing stage and two non-isolated regulators, one on each side of an isolation transformer, with the primary side regulating against input voltage changes in an open-loop control mode, while the secondary side regulates against load current changes, as well as any voltage variations, via a closed feedback loop.

The power processing stage on the primary side comprises the dc voltage source in series with an input inductor L, energy transferring capacitor $C_P$ and the primary winding of the isolation transformer in that sequence and a current bidirectional switching Q connecting the junction of the inductor L and capacitor $C_P$ to the return current path of the transformer primary winding; an auxiliary circuit comprising a series connection of a current bidirectional switch $Q_a$ and capacitor $C_a$ connected in parallel with the switch Q, and switching means for driving the two switches Q and $Q_a$ out of phase such that when one is ON the other is OFF, and vice versa; and a secondary circuit comprising the secondary winding of the isolation transformer in series with a capacitor $C_{1s}$, current bidirectional switch $Q_1$, output inductor $L_1$ and load R, and a rectifier diode D connecting the junction between the switch $Q_1$ and output inductor to the return current path of the load, and means for synchronizing a secondary side feedback circuit to the bidirectional current switch $Q_1$ with the fixed clock rate of the primary open-loop regulator and provide drive signals to turn ON the two transistors Q and $Q_1$ at the same instances in time dictated by the fixed clock frequency, and to turn them OFF individually as dictated by the two primary side open-loop and secondary side closed-loop regulators.

The auxiliary circuit $Q_a$, $C_a$, with appropriate switching, insures that the primary side operates always in CICM mode even at light loads and no loads, and in this way makes possible implementation of the primary side open-loop regulation using a simple circuit comprising an operational amplifier, comparator and cyclical ramp (sawtooth) generator.

Another extension of the present invention increases efficiency by adding another rectifier diode $D_1$ connecting the junction between the secondary side energy transfer capacitor $C_{is}$ and the switch $Q_1$ to the return current path.

Yet another extension of the present invention replaces the output rectifier diode D with a bidirectional current switch $Q_2$ in the form of a synchronous rectifier MOSFET that eliminates the need for auxiliary circuit $C_a$, $Q_a$, but still provides a simple open-loop regulation against input voltage changes on the primary side.

Other variants include multiple output extension with a full regulation of all outputs in a single power processing stage, as well as independent protection of each output.

BRIEF DESCRIPTION OF THE DRAWINGS

FIG. 5 is a schematic of prior-art three-switched network converter with two outputs regulated against changes of both input voltage and load current by control of secondary side duty ratios, while the active bipolar transistor on the primary side operating at a constant duty ratio d as illustrated by control signal timing waveforms shown in FIG. 5a.

FIGS. 6b and 6c illustrate signal waveforms of FIG. 6a.

FIG. 11a depicts the addition of auxiliary circuit $Q_a$, $C_a$ for elimination of DICM mode of operation due to diode $D_1$ and shows that the auxiliary circuit conducts the small ac current ripple only, while the main capacitor C conducts the square-wave like current proportional to dc load current $I_1$ in FIG. 11b and in FIG. 11c that switch Q current has an rms value an order of magnitude larger than the triangular current of auxiliary switch $Q_a$, resulting in efficient and inexpensive implementation of the auxiliary circuit.

FIG. 14 is a schematic diagram of a second preferred embodiment, in which the output diode is replaced with a synchronous rectifier MOSFET $Q_2$ while the same open-loop control implementation of FIG. 9b is retained as illustrated by control signal timing waveforms shown in FIG. 14a.

DESCRIPTION OF PREFERRED EMBODIMENTS

Figure 5:
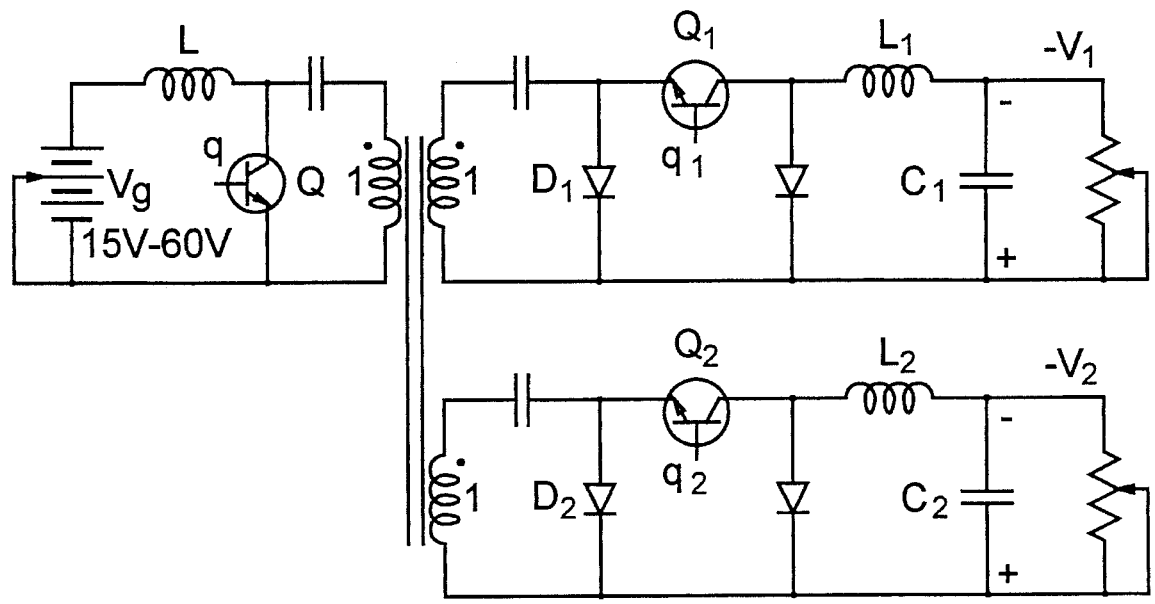
Figure 5A:
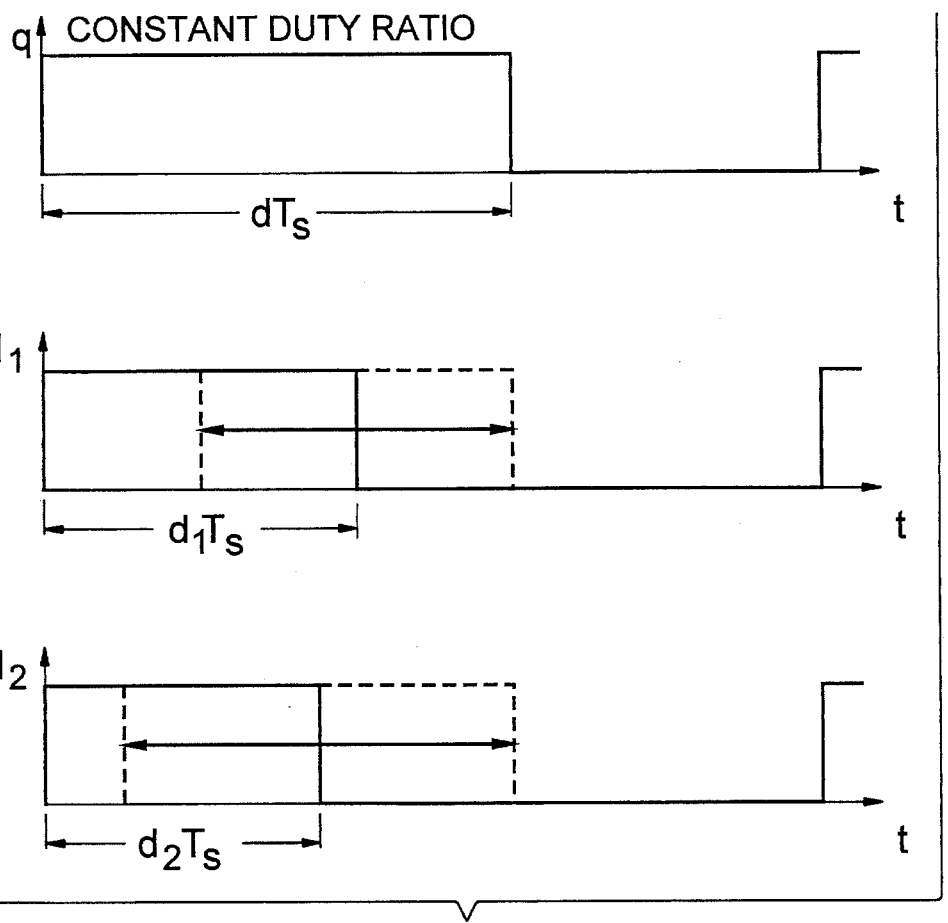
Figure 6A:
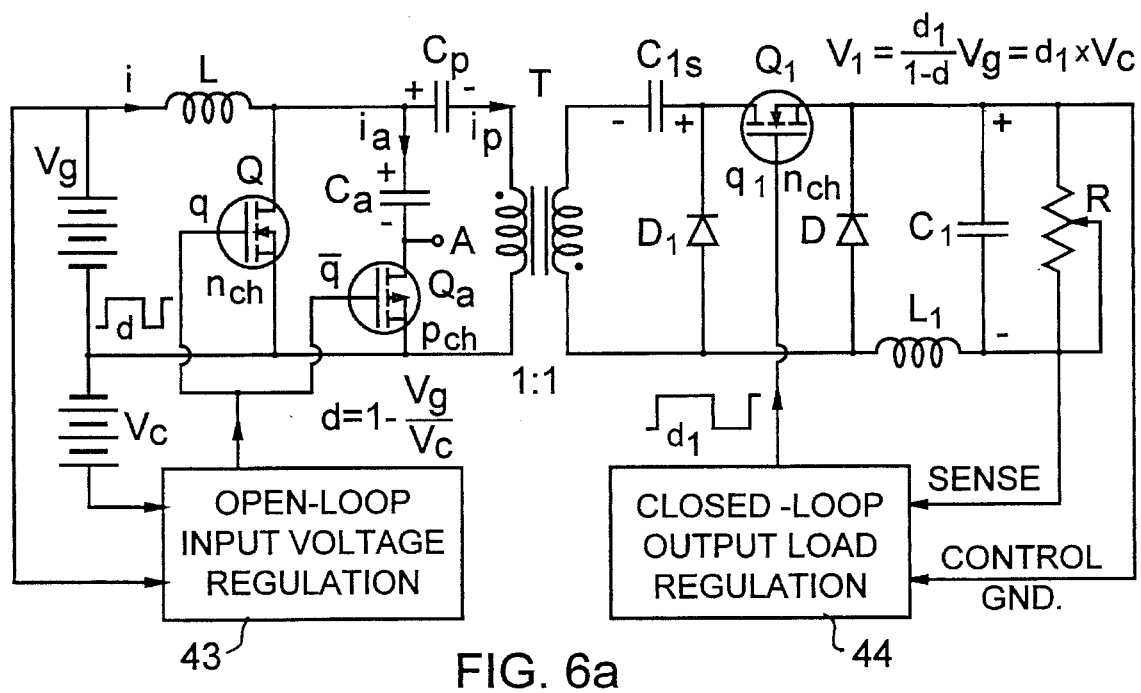
FIG. 6a is a schematic diagram of the first preferred embodiment of the present invention, which exhibits the power stage of FIG. 5a with auxiliary circuit $Q_a$, $C_a$ with current bidirectional switches Q and $Q_a$, and the addition of open-loop control box on the primary side and closed-loop feedback block on the secondary side. The appropriate control law described herein leads to an open-loop regulation against the changes of the input voltage for all load currents from full load to no load, while the load current changes are regulated by the secondary side closed-loop feedback. Both primary and secondary controls are non-isolated with direct drives to respective active switches.
Figure 6B:
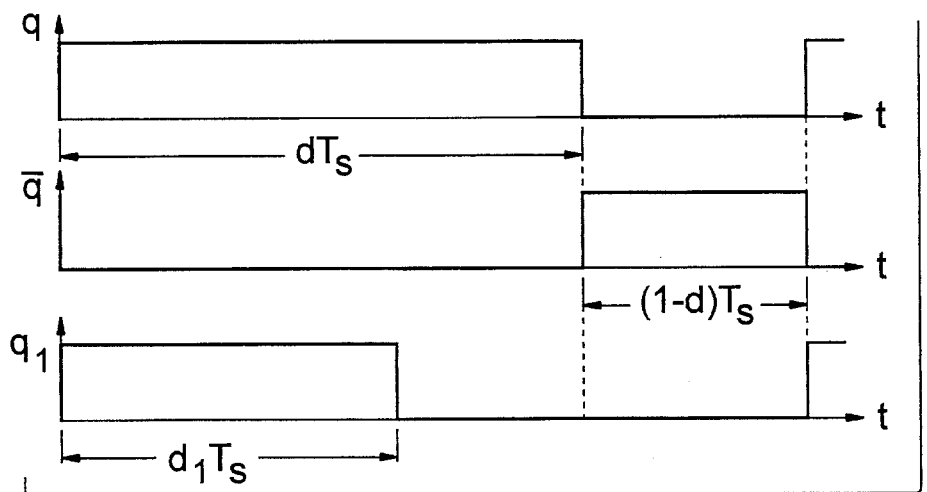

The performance deficiencies outlined for the prior-art converters are eliminated in the present invention of the switching converter shown in FIG. 6a which illustrates the first preferred embodiment showing the isolated switching converter power stage, its primary side control box 43 and secondary side control box 44. This clearly demonstrates the first feature of the converter which is elimination of the isolation requirement in the control circuit. The switching converter power stage features an auxiliary switch $Q_a$ added in series with a capacitor $C_a$ across the primary side active switch Q, which along with the proper driving and control requirements shown in FIG. 6b for all three active switches Q, $Q_a$ and $Q_1$ is indispensable for proper operation of this converter circuit. The proper operation of the circuit also requires that active switches Q and $Q_a$ be implemented as current bidirectional switches such as MOSFET transistors in FIG. 6a and not as bipolar transistors (current unidirectional switches) as in Mahadevan et al. and in FIG. 5. In addition, the primary side control box 43 and secondary side control box 44 provide the unique control requirements of this power conversion topology which achieves a complete separation of the regulation against input voltage changes and load current changes, and eliminates the need for crossing the isolation barrier of the transformer in the converter circuit. In particular, the primary-side control regulates against input voltage variations, while the secondary side regulates primarily against the load current changes using a closed-loop feedback control. This closed-loop feedback control is comprised of either simple voltage feedback as shown or a more complex current-mode programming control circuit. Furthermore, the input voltage regulation is achieved in an open-loop manner thus eliminating any potential problems of unwanted oscillations and stability, which would occur had it been regulated in a closed loop fashion. The open-loop control also provides an instantaneous adjustments of duty ratio of primary active switch Q and, in conjunction with the auxiliary switch $Q_a$ and capacitor $C_a$, results in ideal input voltage transient response without overshoot for full load, light load and no load conditions. Furthermore, this open-loop control effectively provides a pre-regulated voltage to the secondary side power stage as will be described bellow, so that the secondary side closed-loop feedback operates at fixed operating point duty ratio D and has ideal second-order minimum phase dynamic response. Thus a stable wide bandwidth feedback loop approaching theoretical limit of one half the switching frequency is achieved and fast step-load current transient response is obtained.

All performance advantages of the present inventions originate in its unique power stage configuration characterized by the capacitive energy transfer through two capacitors, primary side capacitor $C_p$ and secondary side capacitor $C_{1s}$. In addition, the secondary side active switch $Q_1$ introduces a controllable capacitive idling interval $t_i=(d-d_1)T_s$ during which two capacitors are neither charging nor discharging, but idling. Note also that the sum of the two capacitor voltages (for transformer turns ratio 1:1 of FIG. 6a) is denoted $V_c$. For simplicity of explanation the special case of 1:1 turns ratio is chosen although the analysis which follows is directly applicable by appropriate scaling to the general case of an arbitrary transformer turns ration n:1. Note also that this voltage $V_c$ is also the effective dc input voltage to the secondary side power stage comprising transistor $Q_1$, diode D and output filter $L_1$, $C_1$. The detailed analysis of the converter using standard methods, such as Volt-sec balance on inductors results in the following dc conversion gain of the converter $$V_c=V_g/(1-d) \tag{1}$$

$$V_1=V_c d_1 \tag{2}$$

These equations clearly expose the unique property of this converter in which the input voltage and load current variations can be completely separated. From equation (1), the voltage $V_c$ depends only on $V_g$ and d, and not on $d_1$. Thus input voltage variations could be absorbed on primary side by controlling this intermediate quantity $V_c$, while the load current changes are absorbed by controlling the duty ratio $d_1$ on the secondary side. This is also clearly seen on the simplified model of the converter shown in FIG. 7a in which the 1:1 turns ratio isolation transformer is eliminated by reflecting the secondary side to the primary side and changing the polarity of secondary side devices due to original polarity inversion property of the transformer in FIG. 6a. In addition, the auxiliary circuit $Q_a$, $C_a$ is temporarily removed to expose clearly the need for its inclusion at the later stage. The same separation of the effects of two duty ratio changes is clearly exposed in FIGS. 7b and 7c. Wide input voltage changes result in wide changes of duty ratio d, while wide load current changes result in very small changes of duty ratio $d_1$. The input voltage variations could be absorbed by regulating the intermediate voltage $V_c$ in either of two ways: closed-loop and open-loop or a combination of the two. All three will be explored in the present invention and will result in several preferred embodiments. However, the most attractive is an open-loop control strategy, since it naturally avoids the stability and oscillation problems associated with closed loop feedback systems as well as inherent voltage overshoots associated with the second order or higher order non-minimum phase systems.

The open-loop control strategy for this converter can be easily derived from its non-linear gain step-up function in equation (1) as:

$$d=1-V_g/V_c \tag{3}$$

Figure 7A:
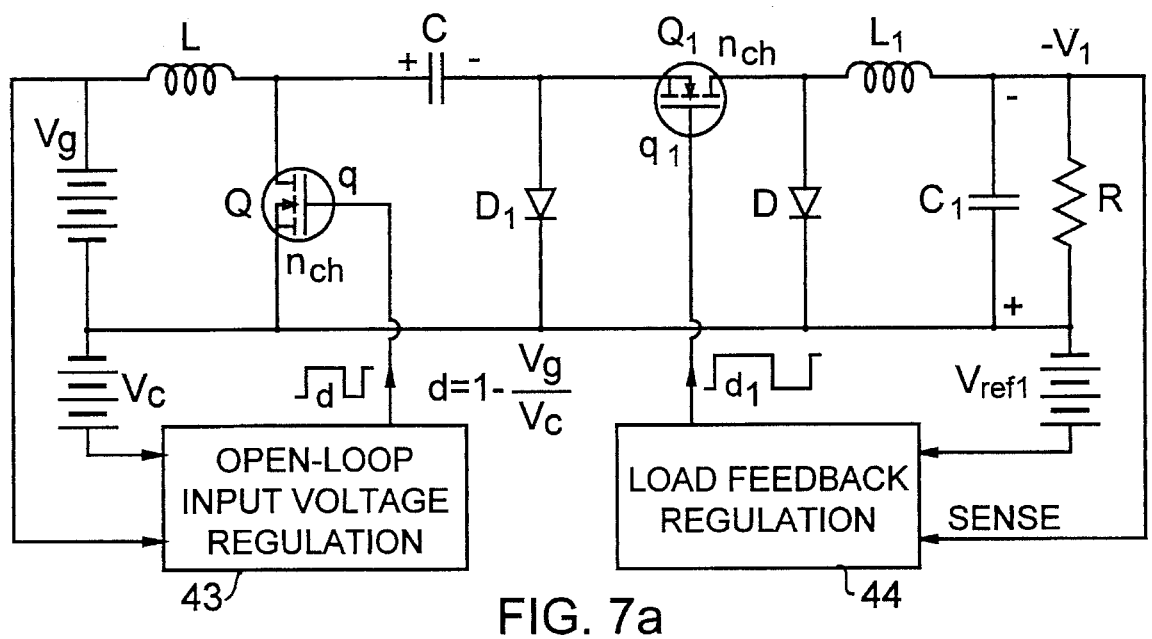
FIG. 7a depicts a simplified circuit model of the converter in FIG. 6a in which auxiliary circuit $Q_a$, $C_a$ is also removed in order to facilitate explanation of the open-loop control with reference to FIGS. 7b and 7c and explain the problems encountered when this circuit is not included.
Figure 7B:
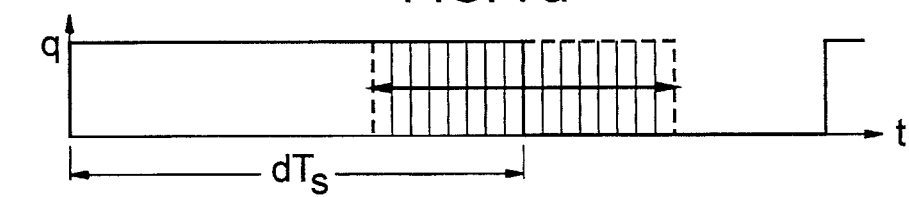
Figure 7C:
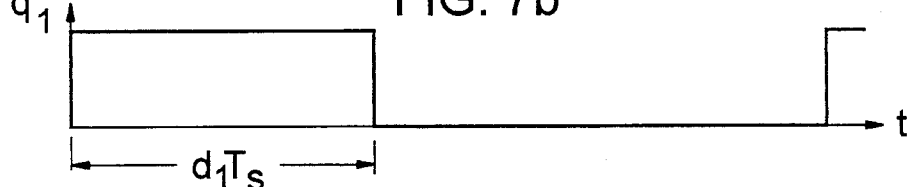

Note that in the above expression the voltages $V_g$ and $V_c$ are input quantities and as such are designated by inward pointing arrows in the open-loop control box 43 of FIG. 6a and FIG. 7a. The duty ratio calculated according to equation (3) is then the output quantity and as such is designated with an outward pointing arrow.

As in all-open-loop controls, one possible and relatively straightforward implementation is to compute according to the control law of equation (3) the needed duty ratio d for any given variable input voltage $V_g$ and desired constant voltage $V_c$. Such an implementation could be achieved by converting the input voltage $V_g$ into a digital signal via Analog to Digital converter, and computing a discrete duty ratio according to equation (3) from the constant voltage $V_c$ set in digital form or to make a custom Analog to Discrete duty ratio controller. These methods could become more attractive in the future with more advanced and less costly digital signal processing technology and custom IC solutions. However, at the present level of technology, a simpler and more practical implementation is to use standard analog circuit components such as comparators, and/or operational amplifiers to synthesize the control strategy equation (3).

Figure 1:
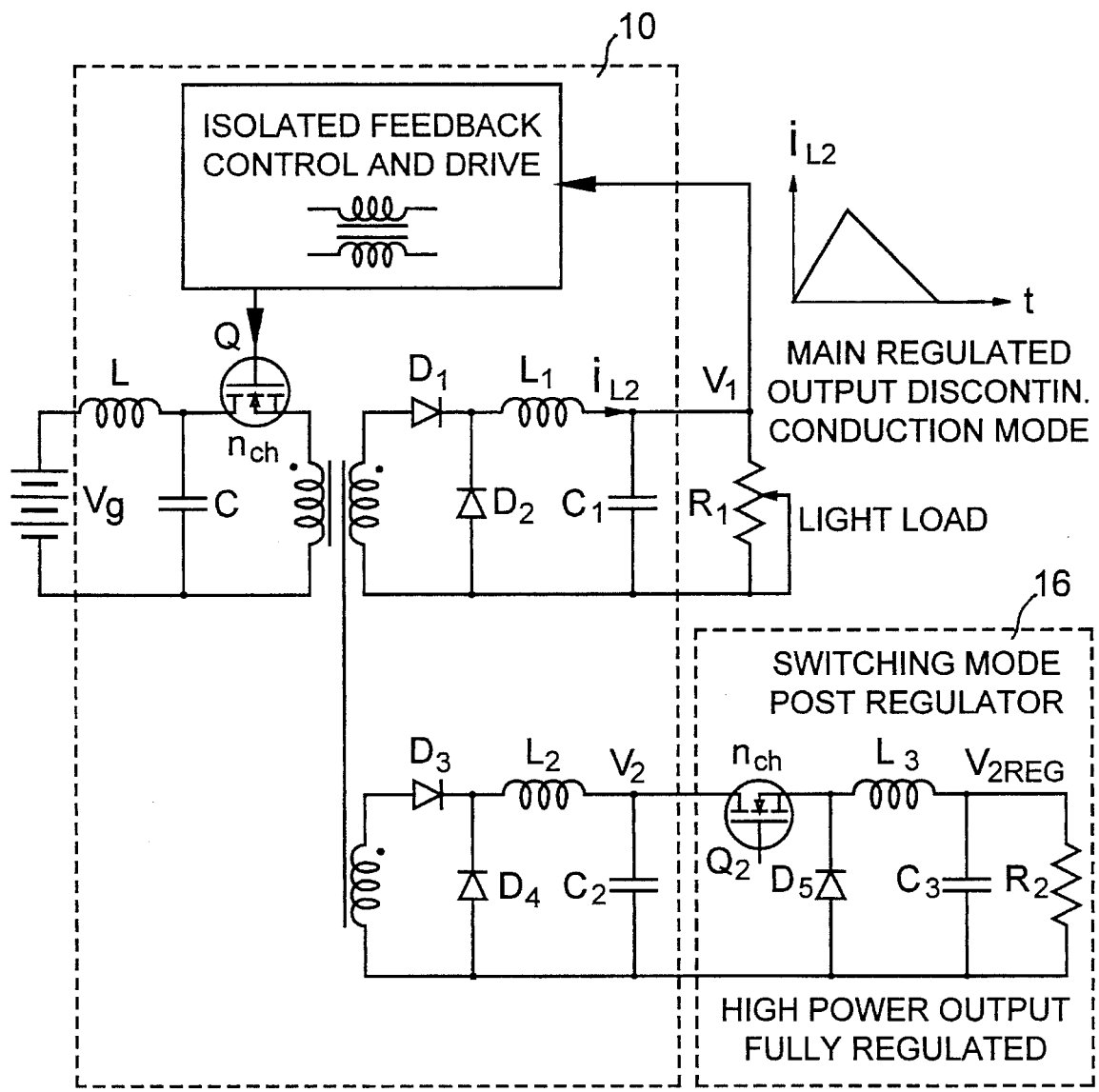
FIG. 1 is a schematic of a prior-art multiple output forward converter illustrating the two performance disadvantages of conventional switching converters: the requirement for isolation in the feedback control path and the inability to provide full regulation of multiple outputs, thus requiring addition of expensive and inefficient post-switching regulators.
Figure 2A:
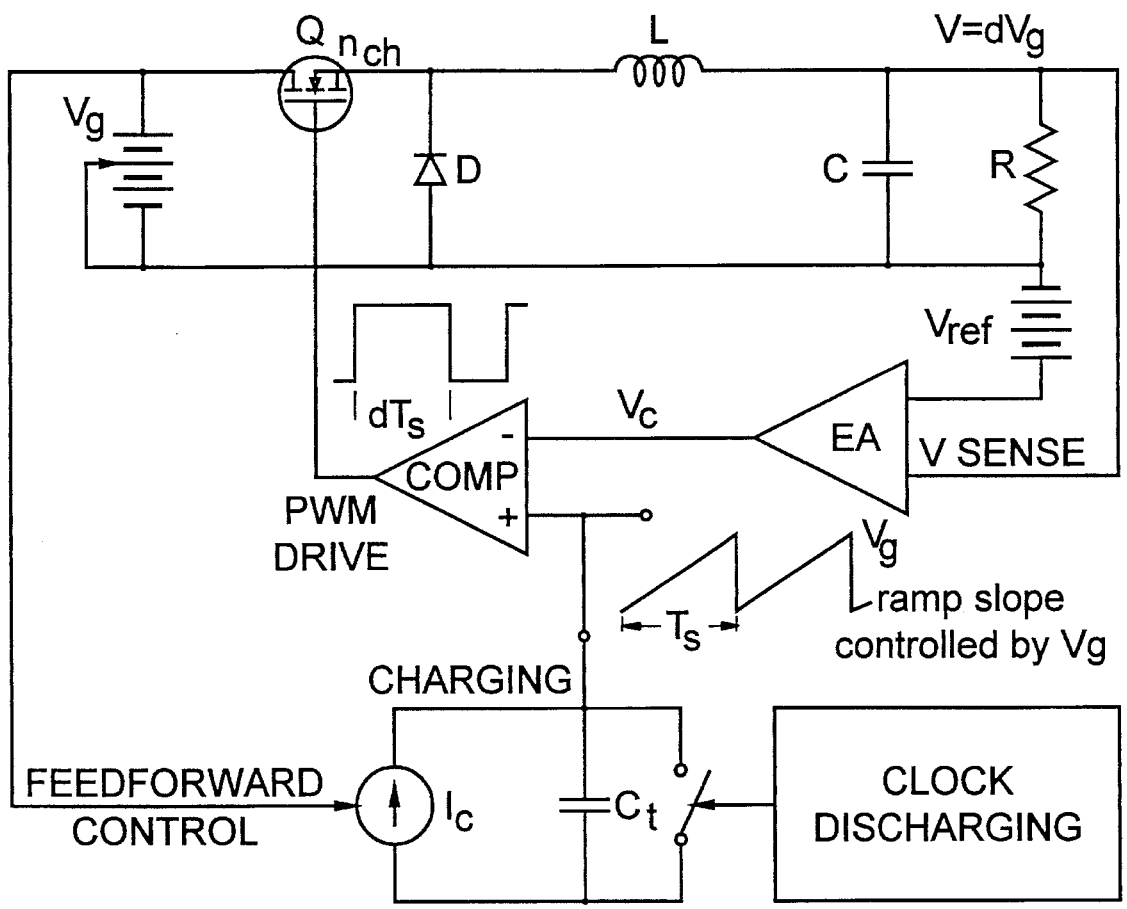
FIG. 2a illustrates feedforward control of a buck converter which improves the transient response due to step changes of the input voltage in CICM mode only (FIG. 2b), but not in DICM mode (FIG. 2c).
Figures 8A, 8B:
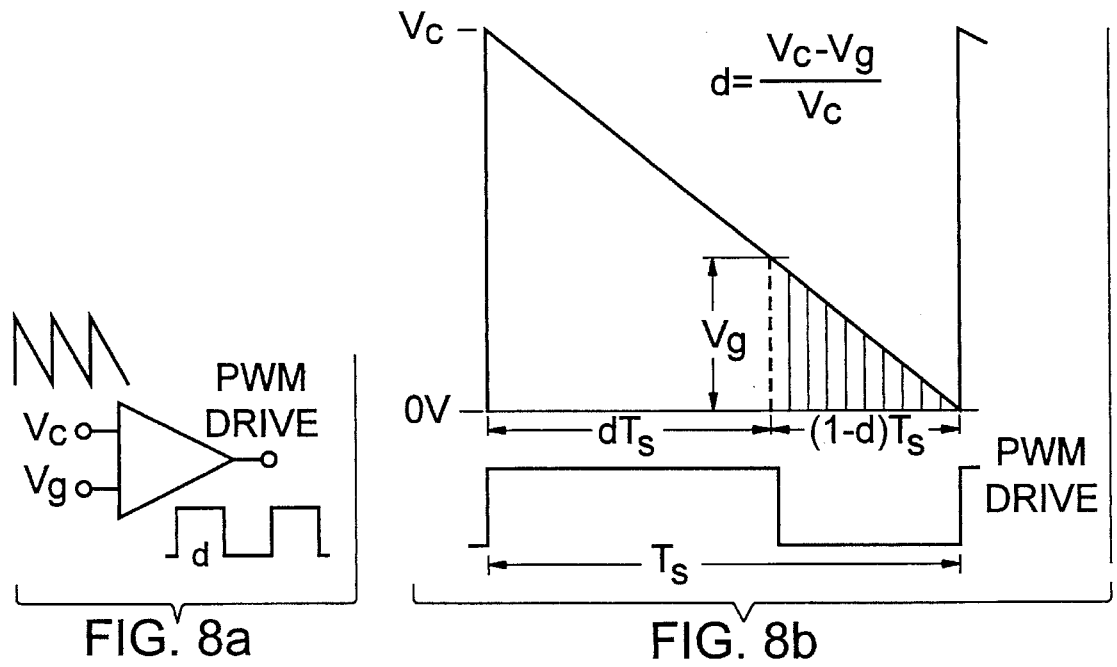
FIGS. 8a and 8b depict a simple analog circuit implementation of open-loop control strategy for the converter in FIG. 6a which utilizes an inverted sawtooth waveform shown in FIG. 8b whose magnitude is proportional to the desired regulated voltage $V_c$.
Figure 9A:
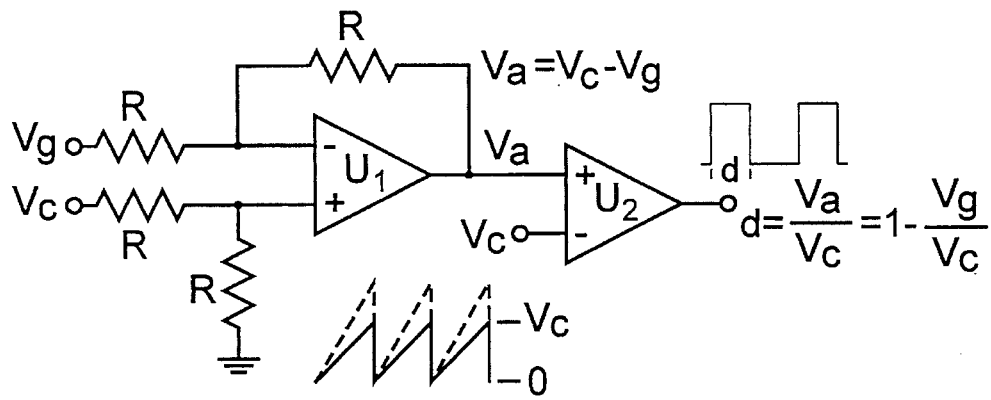
FIG. 9a is another practical implementation of the open-loop control box in FIG. 6a using operational amplifiers and having two inputs, $V_g$ and $V_c$ and output d and featuring sawtooth with variable slope dependent on $V_c$.
Figure 9B:
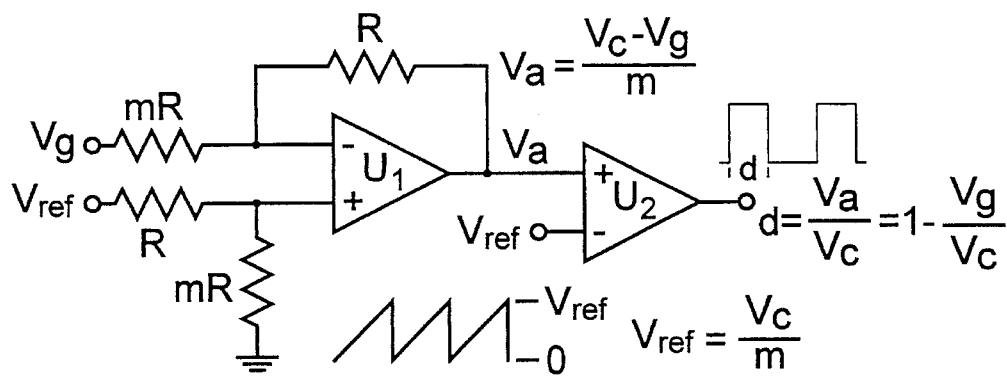
FIG. 9b is a scaled version of FIG. 9a having a fixed reference input voltage $V_{ref}$ instead of $V_c$ and featuring the constant magnitude sawtooth.

One such possible implementation is shown in FIG. 8a using a simple comparator U2. Unlike the up-going sawtooth with the variable slope dependent on $V_g$ in the buck converter of FIG. 2, the constant down-going sawtooth determined by the desired constant voltage $V_c$ is used as one input to the comparator. The other input is the variable input voltage $V_g$ as distinct from error voltage of the feedforward buck converter of FIG. 2. The similarity of the shaded triangle with the large triangle leads directly to the control law of equation (3). However, the use of an additional operational amplifier U1 such as in FIG. 9a leads to a more practical realization which uses ordinary up-going ramp, but still with the slope dependent on the desired regulated voltage $V_c$ as shown by the slope with dotted lines. The implementation in FIG. 9a has as input variables $V_c$ and $V_g$ and as output the needed control signal of the duty ratio d, thus representing one possible direct realization of the primary side control box designated Open-Loop Input Voltage Regulation in all figures. Another even more practical realization is shown in FIG. 9b which is a scaled version of that in FIG. 9a. The key feature of this implementation is that it features a fixed reference voltage $V_{ref}$ as well as the up-going sawtooth with the fixed magnitude proportional to $V_{ref}$. This is the preferred realization because the readily available commercial IC regulator chip has built in both the stable internal reference voltage $V_{ref}$ as well as fixed magnitude sawtooth. The desired voltage $V_c$ in FIG. 9b is then selected by choosing the appropriate multiplier m, where $$V_c=m\,V_{ref} \tag{4}$$

For example, when $V_{ref}=5$ V, and desired voltage $V_c=600$ V, the multiplier selected is m=120. This multiplier is then easily implemented as the attenuation ratio of the input operational amplifier U1 as in FIG. 9b.

Figure 2B:
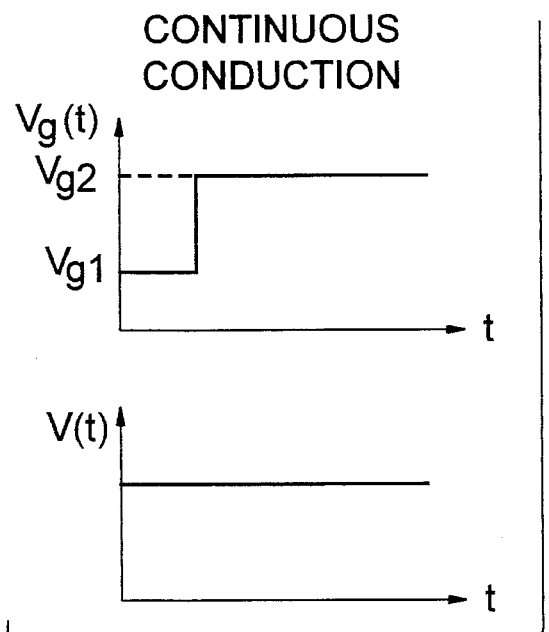

The sawtooth with fixed magnitude is typically synthesized in modern IC regulator chips by charging the capacitance Ct with a constant current source, and then quickly discharging it as shown in FIG. 2. Typical magnitude of the sawtooth ramp in these applications was in the range between 1 V and 2 V. However, since these IC regulator chips were up-to now exclusively used in the closed-loop feedback implementations (there were no open-loop regulation requirements with existing switching converter structures), the linearity of this sawtooth ramp was not important due to closed-loop adjustments, whose accuracy depended critically on the accuracy of the built in reference voltage source and precision resistor divider network and not on the linearity of the ramp. However, for the purpose of the present invention, the linearity of the ramp directly affects the accuracy of the regulation characteristics. This is why for the purpose of experimental demonstrations, the linear sawtooth with 5 V magnitude was built using discrete parts and the scaled version of the open-loop regulation of input voltage $V_g$ was chosen. For this the circuit realization called for R=10K, m=120 and $V_c$=600 V. To test this, the circuit in FIG. 9b was built and the duty ratios for wide range of input voltage $V_g$ (0 V to 600 V) was calculated from equation (3) and measured from the circuit. The comparison data in Table I show that this simple analog method can be used with excellent accuracy for open-loop regulation of input voltage, but one serious problem still remains before this method can be fully implemented.

| Input $V_g$[V] | 0 | 100 | 200 | 300 | 400 | 500 | 550 |
|---|---|---|---|---|---|---|---|
| Calculated D | 1.00 | 0.833 | 0.667 | 0.500 | 0.333 | 0.167 | 0.083 |
| Measured D | 1.00 | 0.83 | 0.66 | 0.49 | 0.32 | 0.16 | 0.08 |

Figure 10A:
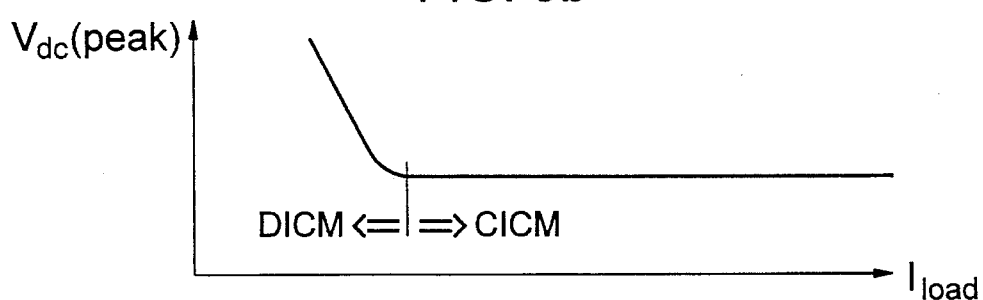
FIGS. 10a, b and c depict voltage of the primary switch Q OFF voltage under light load or no load conditions (a) without peak limiter (b) or with the DICM mode eliminated (e).
Figure 10B:
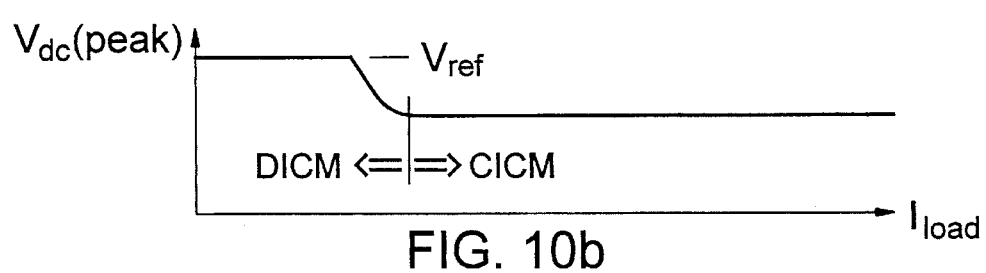
Figure 10C:
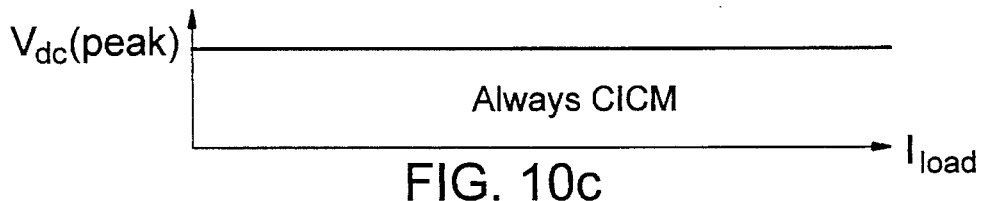

The simple open-loop control strategy in equation (3) is only applicable when the converter is operated at heavy load. At light loads, the effective loading of the output buck stage will also force the primary input stage into discontinuous conduction mode due to the presence of the current unidirectional component, the diode $D_1$ in FIGS. 6a and 7a. When that happens, the actual voltage gain of the primary side is not longer given by equation (1), but is a rather complex function of duty ratio d as well as load current, switching frequency and inductor values. If the open-loop control law of equation (3) is still implemented according to FIG. 8a or either of FIGS. 9a or 9b in such a case, the capacitor voltage $V_c$ will not be regulated, but will instead increase with reduced load currents and would become very large. Although the output voltage could still be regulated by independent control of the output switch $Q_1$ duty ratio d1, this is unacceptable because in this mode of operation, the OFF voltage of the input transistor or Q would also grow without bound and eventually destroy the transistor. In fact, at no load one can see how the OFF voltage of transistor Q would increase without limit. During each cycle, at turn ON of transistor Q, energy is stored on the input inductor L. Then by turning the transistor OFF, it is transferred to the energy transferring capacitor C. Since there is no load current on the output, this would result in an unlimited increase in capacitor voltage and hence in transistor OFF voltage. This phenomena was verified on an experimental prototype and results shown in FIG. 10a. Thus, some mechanism for limiting this drain-to-source voltage $V_{ds}$ at no loads and light loads is needed. One approach is to employ the closed-loop input feedback control strategy once this mode of operation is detected in order to limit this voltage as shown in FIG. 10b and discussed below. Thus, it appears that a fundamental impasses is reached which would make this open-loop control strategy only available for the very limited case of heavy loads, and highly impractical for light and no load cases, which are always encountered in practical applications. Fortunately, the unique topology of the switching converter in FIG. 6a makes it possible to solve this problem thanks to its capacitive energy transferring mechanism with a simple circuit addition to achieve open-loop regulation from no load to full load and maintain the constant OFF voltage (drain-to-source voltage $V_{ds}$) of the primary switch Q. The increase of the OFF voltage of the switch Q and the discontinuous input inductor current mode due to diode $D_1$ can be prevented by the addition of the auxiliary circuit comprising switch $Q_a$ and capacitor $C_a$ connected first in series and then across the switch Q as illustrated in FIG. 11a. Both active switches have to be current bidirectional switches, such as MOSFET transistors, and are driven alternately, when one is ON, the other is OFF and vice versa. In implementation of FIG. 11a switch Q is n channel MOSFET, while switch $Q_a$ is p channel MOSFET. Thus, their gates could be connected together as in FIG. 11 and driven from a common bipolar voltage drive (say +10 V to −10 V square-wave drive). Note that in other unipolar drive waveforms associated with other disclosed figures, the positive voltage means the switching device is ON while zero voltage means it is OFF even though a negative voltage is actually used to turn a p channel devise ON. This connection has an advantage of providing automatic protection against overlapping conduction of two switching devices, thus eliminating the circulating current which would appear when both devices Q and $Q_1$ are ON at the same time. In other practical applications, especially higher power and/or higher voltage applications, due to unavailability of higher rated p channel MOSFET devices, the n channel devices could be used for the auxiliary switch $Q_a$. In that case, a floating drive is necessary and the devices Q and $Q_a$ are driven from the control circuit with properly designed drives having a minimum dead time to prevent overlapping conduction of two devices.

Such switching arrangement ensures that the square wave current dependent on the output dc load current is flowing through the energy transferring capacitor C, while the auxiliary capacitor $C_a$ due to the current bidirectional switches conducts ac ripple current $i_a$ only without any dc load component as seen in the waveforms of FIG. 11b. Thus, even at zero dc load current, the energy stored in the input inductance as ripple current is not used to build up the charge on energy transferring capacitor C as described before, but is instead recirculated between the input source and the auxiliary capacitor $C_a$. Thus input current at no load has zero average (DC component zero) and has a two-interval voltage waveform characteristic of the Continuous Inductor Current Mode (CICM) as shown in FIG. 11c. The auxiliary capacitor $C_a$ is charged to the same dc value $V_c$ as capacitor C at no load, thus keeping the OFF voltage of the device limited to the same original value. Note that this preserves the operation of the input stage in the continuous inductor current mode even at no load and light loads. Thus, the same simple dc conversion gain given by equation (1) and the open-loop control law given by equation (3) applies for all load current conditions from no load to full load. Clearly the same is true for the first preferred embodiment, the isolated version illustrated in FIG. 6a.

Figure 6C:
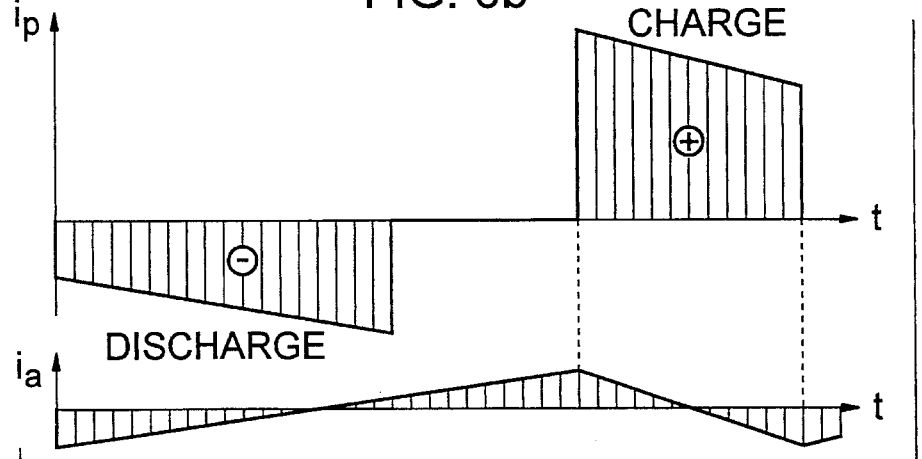

The remaining practical question is when is the penalty one might pay in terms of efficiency and cost for the addition of such an auxiliary switch $Q_a$ and capacitance $C_a$ in order to preserve simplicity of the open-loop regulation equation (3). The typical current waveforms of the two active switches Q and $Q_a$ are shown at full load in FIG. 6c and FIG. 11b. Note that main switch Q contains the large square wave part due to the power processed to the main output V1 as seen in the switch current waveform in FIG. 11c. The switch Q current has two distinct slopes, since in the first interval when both Q and $Q_1$ conduct it conducts the sum of the input and output currents, while in the second interval it conducts input current only because switch $Q_1$ is OFF. The auxiliary switch $Q_a$ only passes the ac ripple component seen in FIG. 11b. If the ripple current is only 10% of the dc load current, the effective (rms) value of the auxiliary switch current can easily be 5 to 10 times smaller than effective (rms) value of the main switch, thus making the loss of the auxiliary switch with comparable ON resistance only 1% to 4% of the main switch loss. Thus, an auxiliary switch with significantly higher ON resistance (and corresponding lower cost and smaller size) could be utilized. Similarly, the auxiliary capacitor will carry rms current which is 5 to 10 times smaller. Hence capacitors both with an order of magnitude smaller ripple current ratings, as well appropriately reduced values could be utilized. Hence, the size and cost of the auxiliary capacitor is equally attractive.

It is now obvious that the same auxiliary circuit can be applied with equal success to the isolated converter of FIG. 6a. Note that the auxiliary switch Qa once again prevents the input inductor current i from going into DICM mode despite the presence of the secondary diode D1 in FIG. 11a, which is the part of the boost-like front-end of the converter. Hence inductor current i shown in FIG. 11b at light load is allowed to go negative. Note, however, that in this converter the output inductor current still can go into DICM mode due to the presence of the output diode D, since the output stage behaves like an independent buck converter stage. This, however, has no effect on the behavior of the primary converter side and its CICM mode of operation. This presents no problems, since the secondary side switch $Q_1$ can then regulate the output voltage even when the secondary side is in DICM mode. With the addition of the auxiliary switch and capacitor circuit, the DICM mode of the input boost-like primary part is prevented, and the open-loop regulation of the transistor Q OFF voltage is provided from no load to full load.

Figure 12:
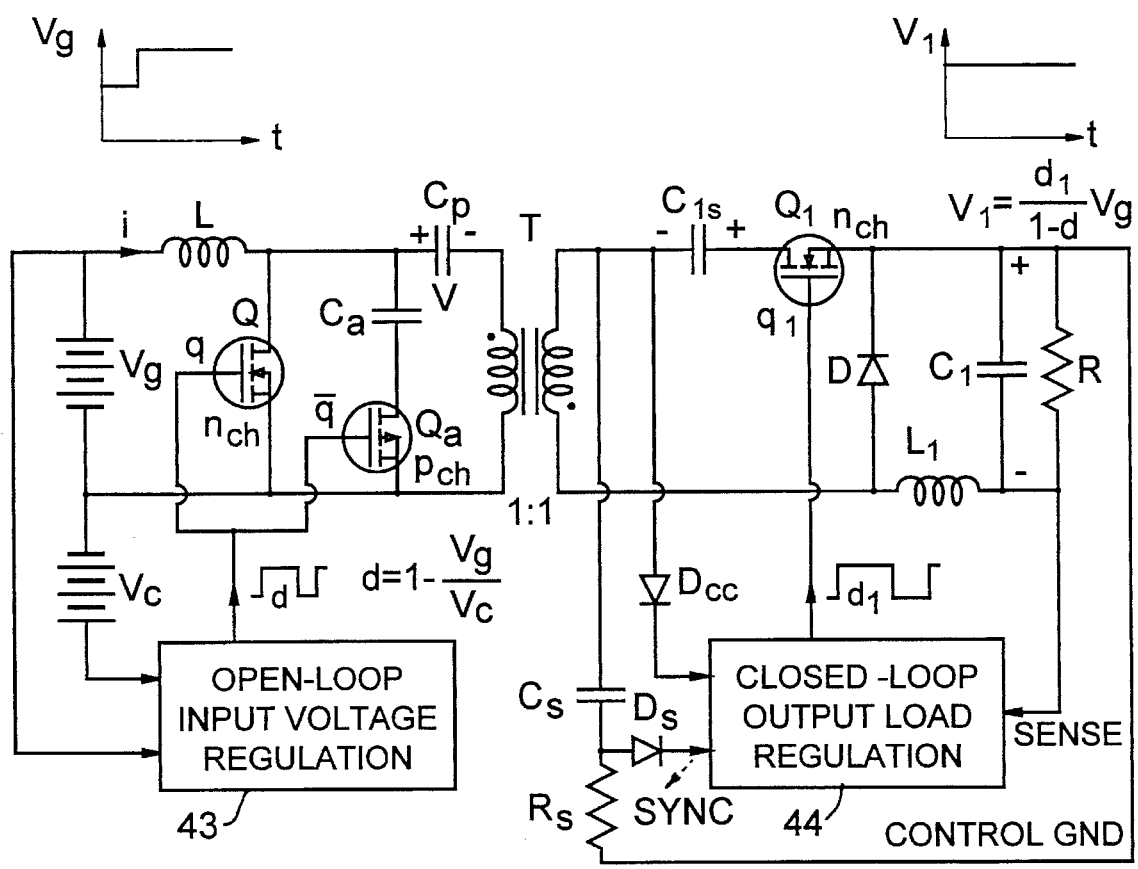
FIG. 12 illustrates one practical and simple way of synchronization of the secondary side control circuit to the fixed clock frequency of the primary side, by use of the differentiator circuit $C_s$, $R_s$ on the square-waves of the transformer secondary, to create the synch pulses by getting positive going pulses to synch terminal via diode $D_S$ and also illustrate how the housekeeping power is provided on the secondary side also by taping the power from the secondary side of the transformer.

The open-loop control circuit on the primary side of FIG. 6a is referred to the primary side, while the closed-loop feedback circuit on the secondary side is referred to the secondary side, thus allowing a major practical simplification by eliminating the isolation requirements from the control circuits. However, both control circuits are operated at the same constant switching frequency as seen by the waveforms in FIG. 6b which poses an additional problem of synchronization of the two control clock rates. Moreover, for practical ease of implementation, it is desirable to have the primary side transistor Q and the secondary side transistor $Q_1$ turned ON at the same time, as also illustrated by the waveforms in FIG. 6a. The practical aspects of the implementation of the synchronization circuitry are not discussed with respect to FIG. 12, which includes the necessary synchronization and housekeeping supply implementation. This figure shows another even simpler realization of the power stage in which the secondary side diode $D_1$ shown in FIG. 6a is eliminated. Its role is played by the body diode of the secondary side switch $Q_1$. Although simpler (only one diode) this implementation is actually slightly less efficient due to the fact that this single output diode D conducts an additional component of the reflected input current, which it did not conduct before. As seen in FIG. 12, the squarewave like waveforms on the transformer secondary can be differentiated by a simple circuit consisting of a capacitor $C_s$ and a resistor $R_s$ series connected. The positive going pulses at the turn ON of primary transistor Q are then gated to the sync input of the IC regulator chip on the secondary side by use of a diode $D_s$, which also prevents negative going pulses, generated by the differentiator circuit at the turn OFF of primary transistor Q, of reaching the sync terminal. The secondary side clock frequency is synchronized with respect to the primary side fixed frequency clock rate. Thus, the communication between the primary and secondary side control circuitry is accomplished through the power transformer itself, which remains the only device subject to safety approvals for isolation.

Another practical consideration is that the power is also needed to power up the primary and secondary side control circuitry. These additional voltages, however, can be in practice taken either by directly rectifying respective primary and secondary side transformer voltages, such as diode $D_{cc}$ in FIG. 12. However, if directly rectified voltage is either too high or too low, it can be scaled appropriately by use of separate small windings added to the isolation transformer. Note that these additional windings are connected either to the primary or secondary transformer sides, thus again preserving a single galvanic isolation for the whole converter in the power transformer itself. Once again separate housekeeping power supplies are not needed and only isolation in the power stage transformer is needed.

Another important advantage of this invention is that the secondary side active switch $Q_1$ in FIG. 12 can be driven by a very desirable direct drive instead of the cumbersome and impractical floating drive requiring isolated gate drive. Even a simple nonisolated buck converter of FIG. 2a has this serious drawback and requires floating drive. Floating drive is a big disadvantage, especially in high power, high current applications as pointed out by Zhe Zhang and Slobodan Cuk, "A High Efficiency 1.8 kW Battery Equalizer", Proc. of 1983 Applied Power Electronics Conference, San Diego, Mar. 6–11, 1983. In the buck converter of FIG. 2, the source of the MOSFET transistor is jumping between essentially ground potential when the diode is conducting and the input dc voltage when the transistor is conducting. Thus, the drive voltage higher than the threshold of 3 V required to turn ON the MOSFET is riding on the top of the very noisy high voltage switching waveform. Any attempt to relocate this switch in the bottom return current path fails since this would not preserve the commonalty of the source and load ground in this nonisolated configuration. The only way to implement direct drive and alleviate the problem of the noise source junction using either a pnp bipolar transistor or a p-channel MOSFET and appropriate negative voltage drive, is clearly not practical and cost effective since neither pnp bipolar transistors nor p-channel MOSFETs are available at the high power, high current rating required as are much more common n-channel MOSFET and npn bipolar transistors.

On the other hand, the output inductor L1 of the buck-like stage in FIG. 7 can be relocated to the bottom return current path in the isolated converter as shown in FIG. 12. This is made possible now due to the floating nature of the transformer secondary. The only difference, as seen in FIG. 12, is that the closed-loop output load regulation IC chip 44 is referenced to the negative output voltage instead of the power ground while providing direct drive to the MOSFET $Q_1$. This is analogous to the situation in the nonisolated stepped-down converter described in Zhang, supra, which also features the same direct drive advantages. The separation of the output power ground from the output control ground is actually desirable in practical implementation in order to prevent the noisy power ground from interfering with the drive and protection circuitry of the converter. For the standard positive output voltage, the standard n-channel MOSFET can be used along with the direct drive. For negative outputs, the n-channel MOSFET device can also be utilized in direct drive configuration in which power and signal grounds are common. The primary side active switch is also referenced with respect to the primary ground, thus also leading to the direct drive implementation. Therefore, there is no need for any floating isolated drive and corresponding drive transformers adding to the complexity of practical implementation as well as degradation of performance, such as spikes, noise, etc.

The performance advantages of the open-loop control are obvious. With the open-loop control, the input voltage changes are instantly compensated by control circuit which for each input voltage dictates a corresponding unique duty ratio. Thus, regardless of the load currents (no load to full load), the output voltage transients due to input voltage changes are eliminated as seen in the voltage waveforms in FIG. 12 and an excellent audio susceptibility characteristic is expected. This is confirmed below in the experimental verification section.

Figure 13:
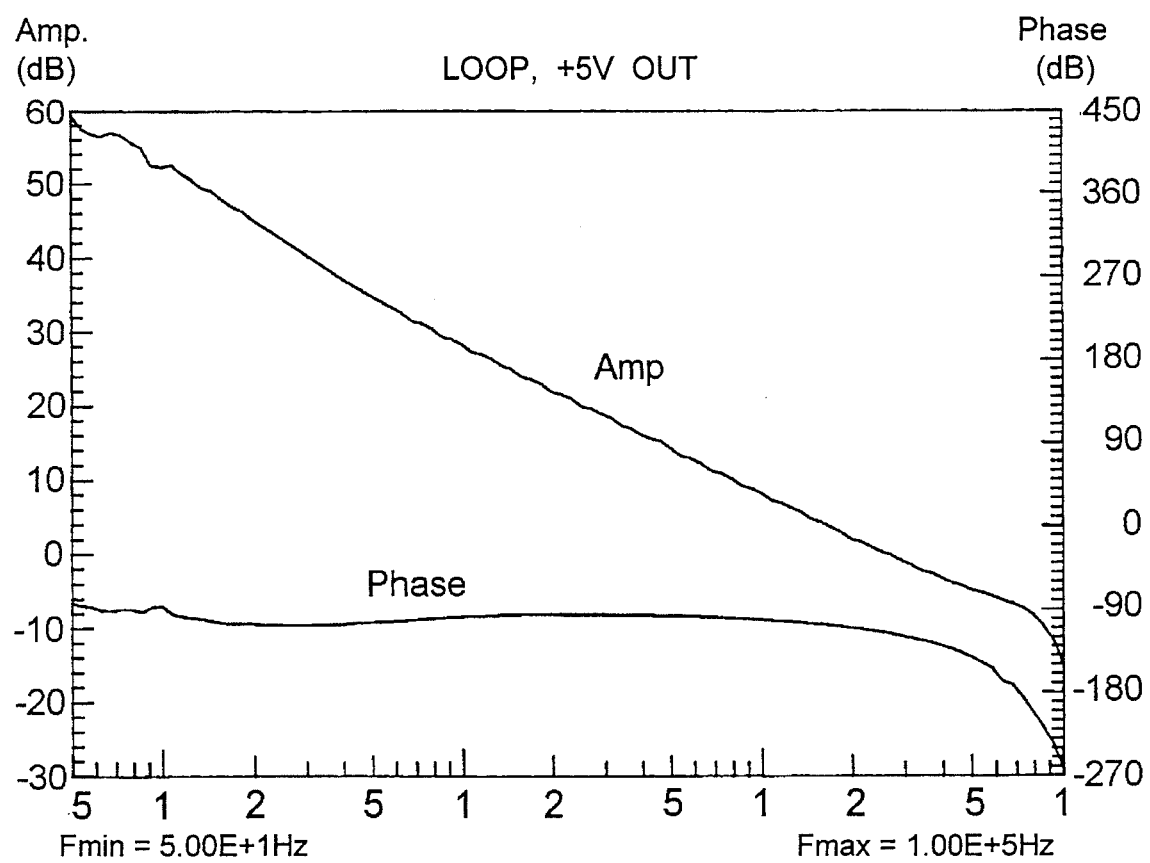
FIG. 13 displays the frequency response of the secondary side which exhibits ideal single pole, no zero's frequency response characteristic with 60 degrees phase stability phase margin and wide 26 kHz bandwidth for 150 kHz switching frequency of the experimental prototype.

Furthermore, the original fourth order system is effectively converted to a well behaved second order response of the buck converter, which could be designed to operate close to the theoretical limit of up to one half the switching frequency as demonstrated below on an experimental prototype. FIG. 13 shows the measured frequency response obtained on the experimental 150 kHz prototype exhibits 26 kHz bandwidth and excellent 60 degrees phase margin. If lower phase margin is accepted, the bandwidth can be extended to 60 kHz.

Figure 2C:
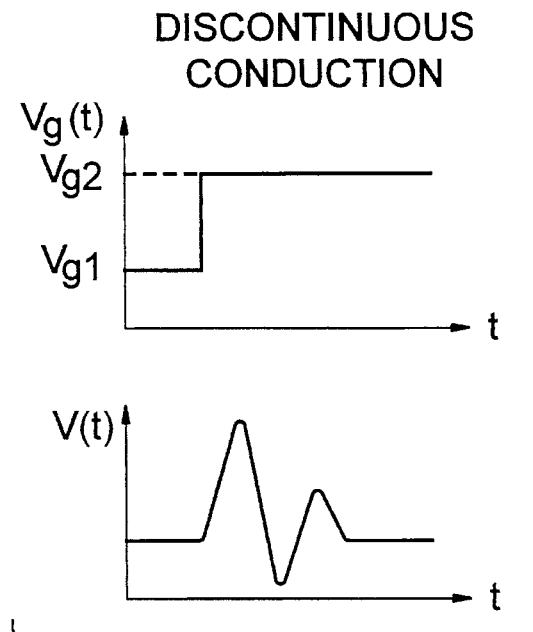
Figure 3:
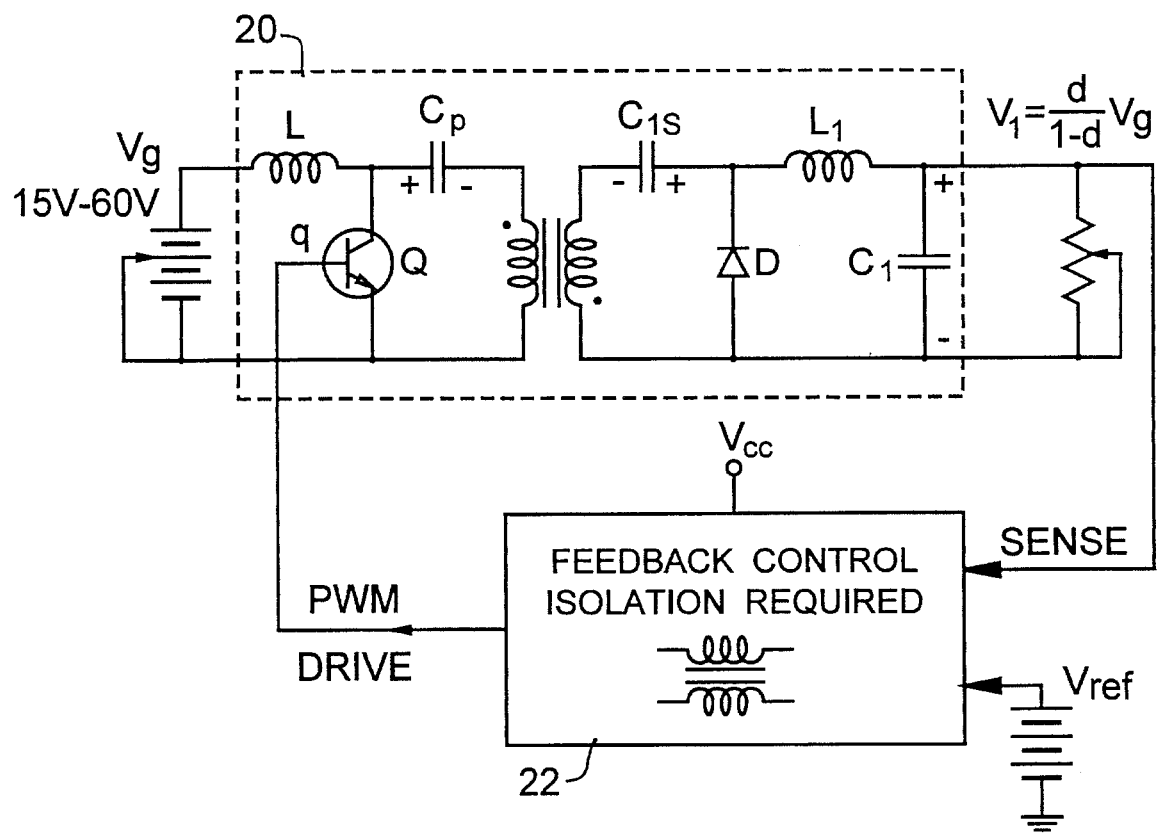
FIG. 3 is a schematic of a prior-art isolated switching converter disclosed in U.S. Pat. No. 4,184,197.
Figure 3A:
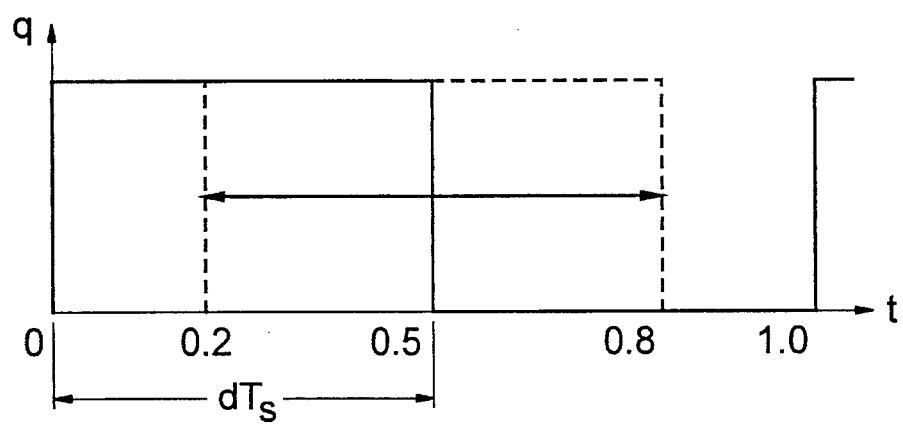
FIG. 3a illustrates control signal timing waveforms of FIG. 3.
Figure 4:
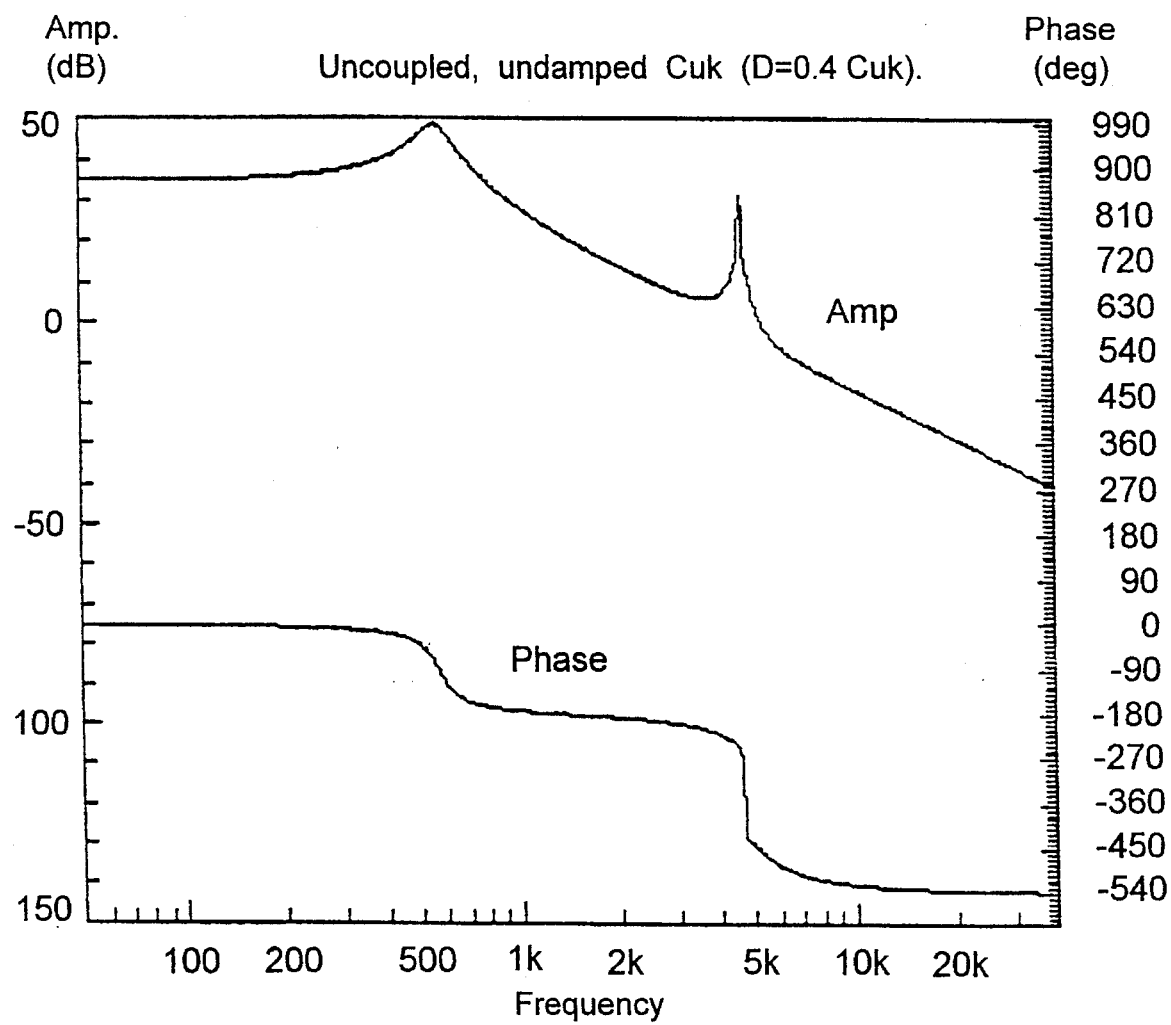
FIG. 4 displays the typical undamped loop-gain frequency response of the converter in FIG. 3. The presence of the right-half plane zeros and four pole control transfer function leads to the limited bandwidth and suboptimal frequency response and transient response performance.

It is now interesting to compare this new open-loop control of switching converters with the classical feedforward control illustrated in FIG. 2 for the buck converter. Large input voltage variations would result in correspondingly large duty ratio variations. The feedforward control is used together with the feedback loop control to improve the transient response due to input voltage changes. As soon as the DICM is encountered at light load, due to more complex load dependent dc gain function, the feedforward control results still in substantial output voltage transients as illustrated in FIG. 2c. The clear distinction can now be drawn between the classical feedforward control and the open-loop control implemented in FIG. 6a and 12a. The feedforward control is intrinsically used only in addition to and combined with the output voltage feedback control in order to improve line transient performance. It can also accomplish this for heavy loads and CICM mode of operation. Furthermore, the very unfavorable frequency response of the control transfer function in the boost and flyback converter (non-minimum phase response) and the Cuk converter of FIG. 3 is still present even in CICM mode of operation and is not eliminated by the feedforward method.

The open-loop control strategy of the present invention eliminates input voltage transients for all loading conditions from no load to full load. Furthermore, in conjunction with the unique capacitive energy transfer topology of FIG. 6a and auxiliary circuit $C_a$, $Q_a$, it also eliminates the undesirable part of the frequency response and reduces the original complex fourth order loop-gain with nasty RHP zeros to a well behaved second order minimum phase control transfer function. Finally, it also simplifies the synchronization of primary side and secondary side control circuitry.

SECOND PREFERRED EMBODIMENT

Figure 14:
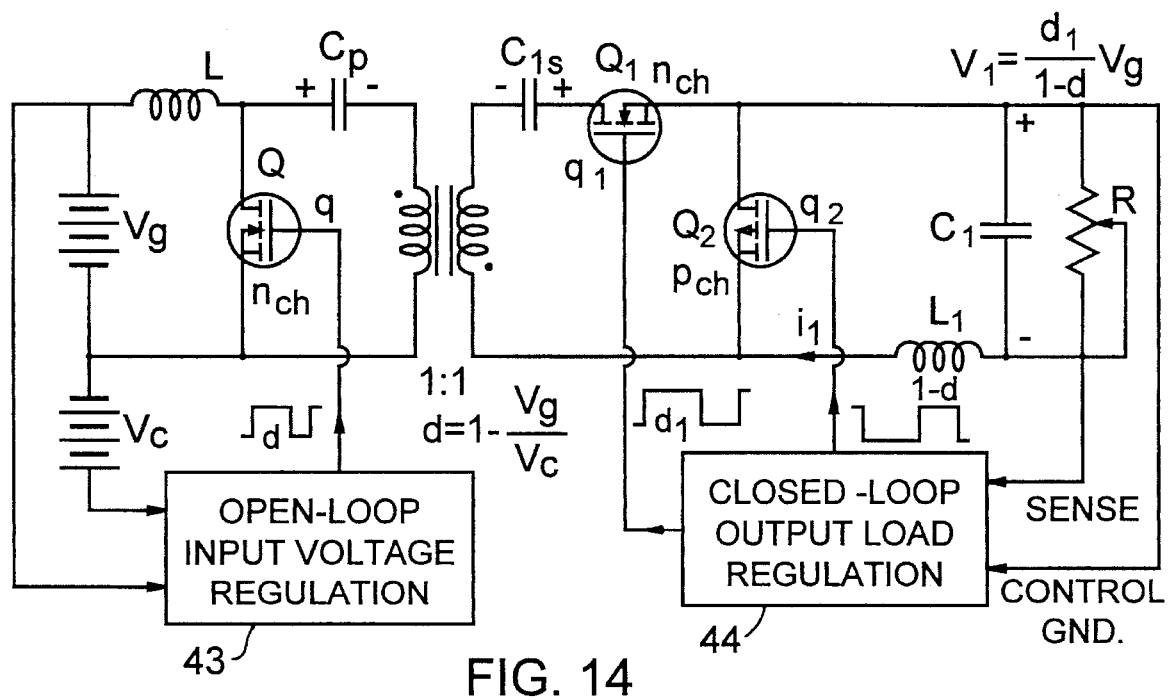
Figure 14A:
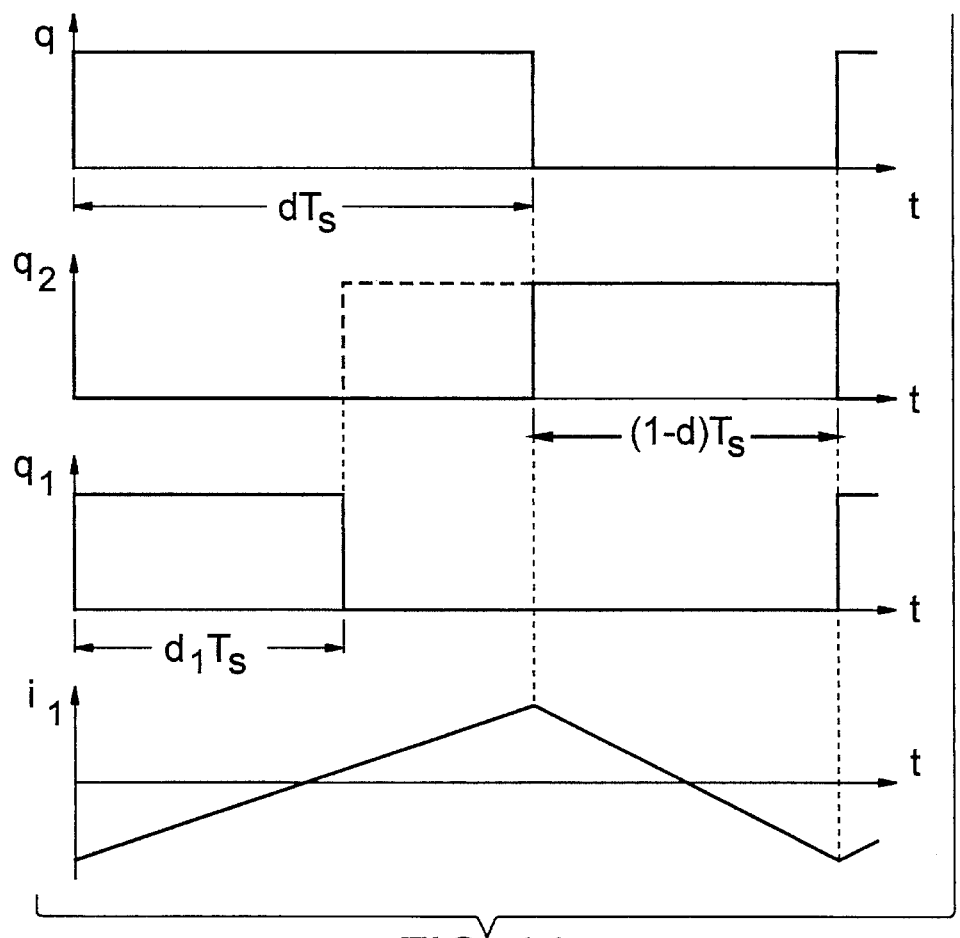

One variant of the present invention which eliminates the problem associated with the DICM mode at light load replaces the output diode D of FIG. 12 with the synchronous rectifier MOSFET $Q_2$ as shown in FIG. 14. This MOSFET is controlled in an out of phase manner with respect to the primary side MOSFET Q as seen from the driving waveforms in FIG. 14a shown in heavy lines such that when Q is ON, $Q_2$ is OFF and vice versa. The added benefit of this variant of the invention is that for low voltage, high current applications, the synchronous rectifier MOSFET could be selected with low ON resistance to reduce conduction losses several times below conduction losses with diode D implementation. For example, with two such 10 mΩ devices put in parallel, a 20 ampere load current would result only in 100 mV ON voltage compared to 0.5 V of the best Schottky diode. Of course, the open-loop regulation of the input voltage will be effective throughout the load current range from no load to full load. Note that in this variant the auxiliary circuit $Q_a$, $C_a$ on the primary side can be completely eliminated. The reason for such behavior is that the MOSFET switch is a bidirectional current device whose parasitic body diode permits the current flow in the opposite direction from the main transistor switch current, thus making a MOSFET an effective current bidirectional switch. Note that in FIG. 14, all three switching devices are current bidirectional MOSFET devices which therefore allows the current flow in either direction. It is well known that the implementation of switches with bidirectional current switches will eliminate the DICM mode by allowing the instantaneous inductor current to become negative (current flow in opposite direction) as shown in the output inductor current waveform of FIG. 14 and even have zero average at no load. Since the CICM mode is maintained from no load to full load, the same simple voltage gain characteristic of the primary converter side is preserved as given in equation (3) and the above simple open-loop control strategy applies. Note that transistor $Q_2$ is shown as a p-channel device so that all three MOSFET devices in FIG. 14 can use direct drive and avoid complication of the isolated floating gate drive. Note that further simplification is obtained when the synchronous rectifier switch $Q_2$ is switched out of phase with the secondary switch $Q_1$ as shown by dotted lines drive waveforms in FIG. 14. As explained before, the gates of two devices could be connected and devices driven with a common non-isolated bipolar voltage drive. However, if desired, n-channel MOSFET devices could also be used for transistor switch $Q_2$ with appropriate drive modifications.

THIRD PREFERRED EMBODIMENT

Figure 15:
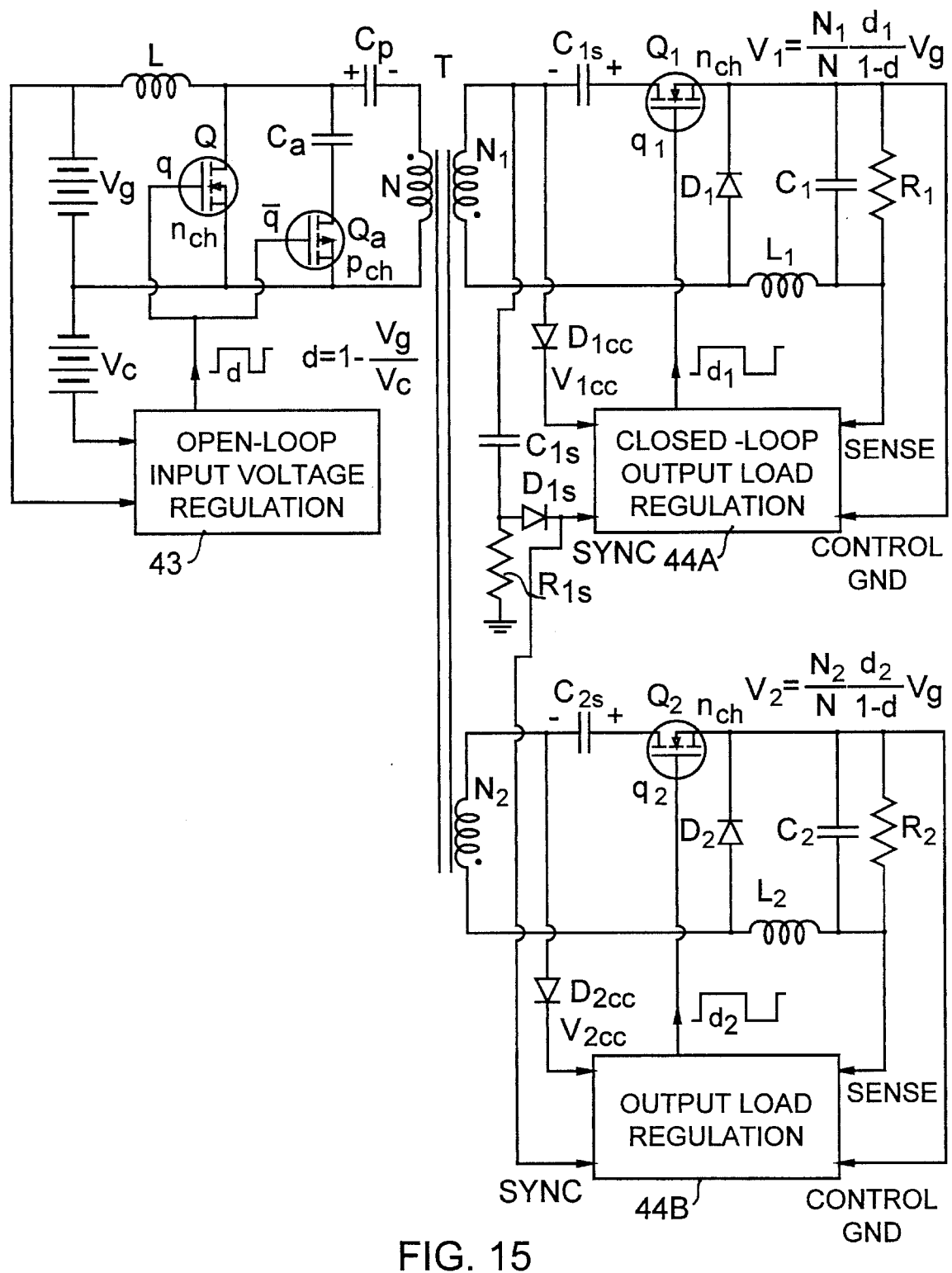
FIG. 15 is the schematic diagram of a third preferred embodiment in which additional desired outputs are added by repeating the secondary side of the converter of FIG. 12 as needed. The dual output extension exhibits full regulation for all loading conditions and independent protection of all outputs.

It is now clear that the single output version of FIG. 12 can be easily extended to the multiple output extension as shown in FIG. 15 for two outputs. As many outputs as desired can be added by simply repeating for each the secondary side. Each output is independently protected due to the presence of the active switch $Q_2$ in series with each output. Thus, a short on any output will turn OFF the respective secondary side active switch $Q_2$ and shut off that output, while the other outputs will continue to operate uninterrupted.

FOURTH PREFERRED EMBODIMENT

Figure 16:
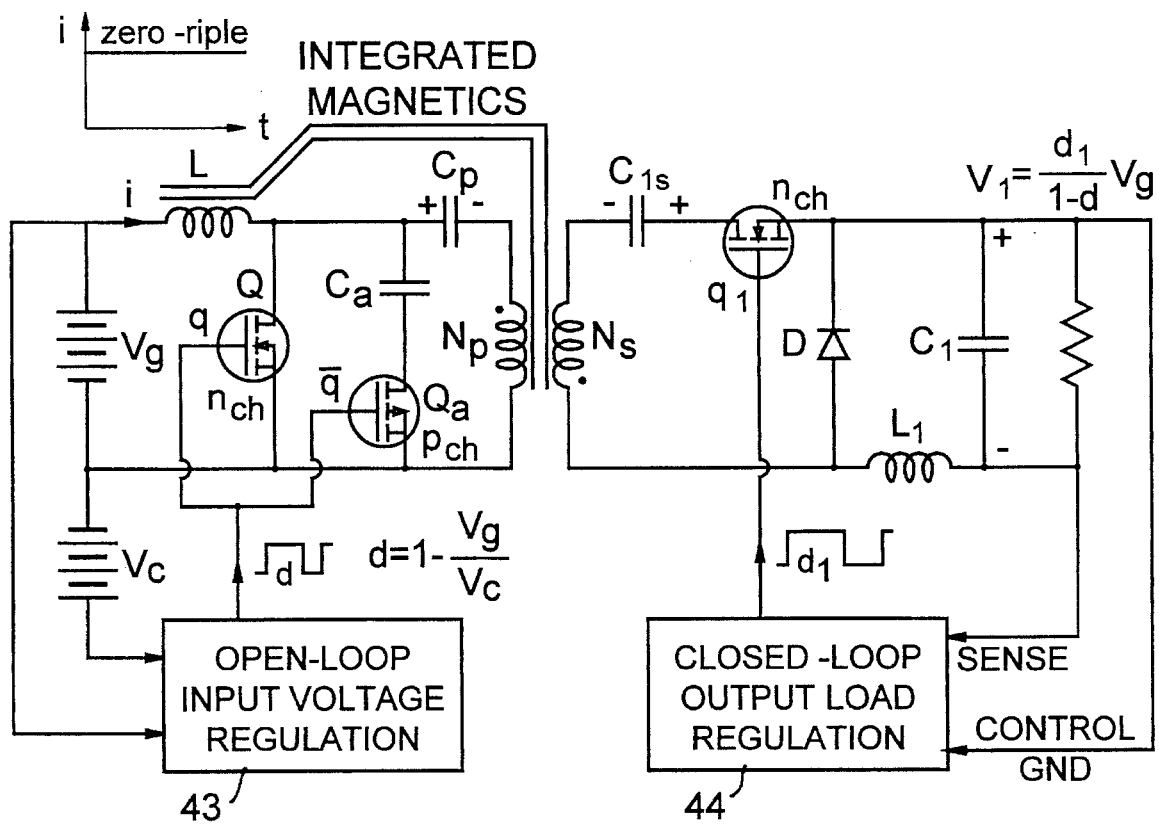
FIG. 16 depicts a fourth preferred embodiment of the present invention, the Integrated Magnetics extension of the converter in FIG. 6a, in which the input inductor and transformer are integrated on a common magnetic core as shown in FIG. 16a and ripple current on the input inductor is substantially reduced in a way similar to the disclosure in U.S. Pat. No. 4,257,087.
Figure 16A:
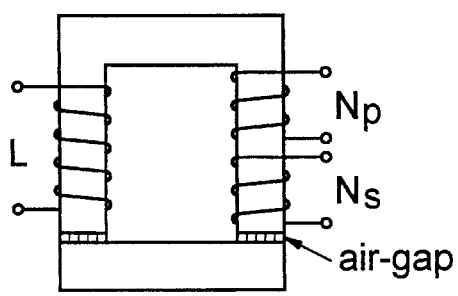
Figure 17:
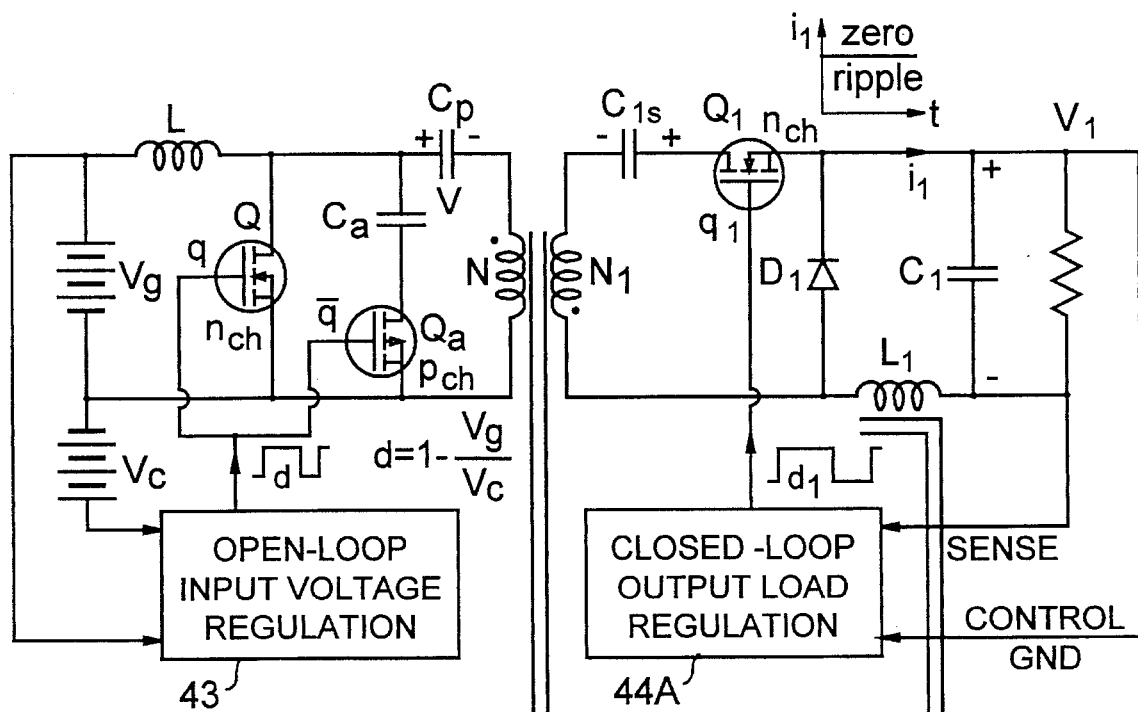
FIG. 17 depicts another implementation of the fourth embodiment of present invention in which the output inductors of the converter in FIG. 6a are coupled on a common magnetic core as shown in FIG. 17a such that the ripple currents are reduced near zero in all output inductors except one as per disclosure in U.S. Pat. No. 4,257,087 and operation is with control signals as shown in FIG. 17b.
Figure 17B:
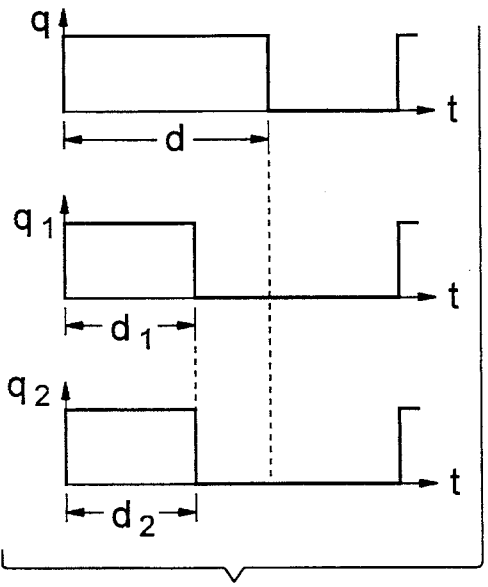
Figure 17A:
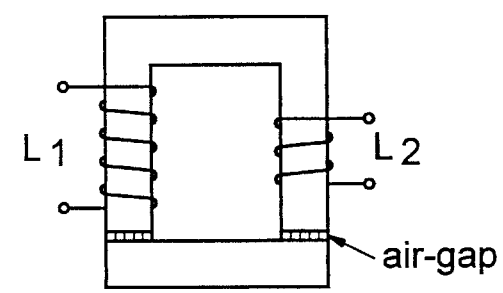

Referring to the first embodiment shown in FIG. 6a, the voltage waveforms of the input inductor L and isolation transformer T are identical. Thus, the input inductor and transformer can be integrated on a common core and the input ripple current shifted from the input inductor into the transformer resulting in a near zero ripple input current as shown in FIG. 16 using a structure as shown in FIG. 16a. Similarly, if the transformer turns ratio's are chosen to match the ratio of dual output dc voltages, the secondary side duty ratios of active switches will be equal, and secondary side inductors will exhibit identical voltage waveforms. Thus, the output inductors $L_1$ and $L_2$ could be coupled as illustrated in FIG. 17 and the beneficial near zero ripple current obtained in all but one of the outputs.

FIFTH PREFERRED EMBODIMENT

Figure 18:
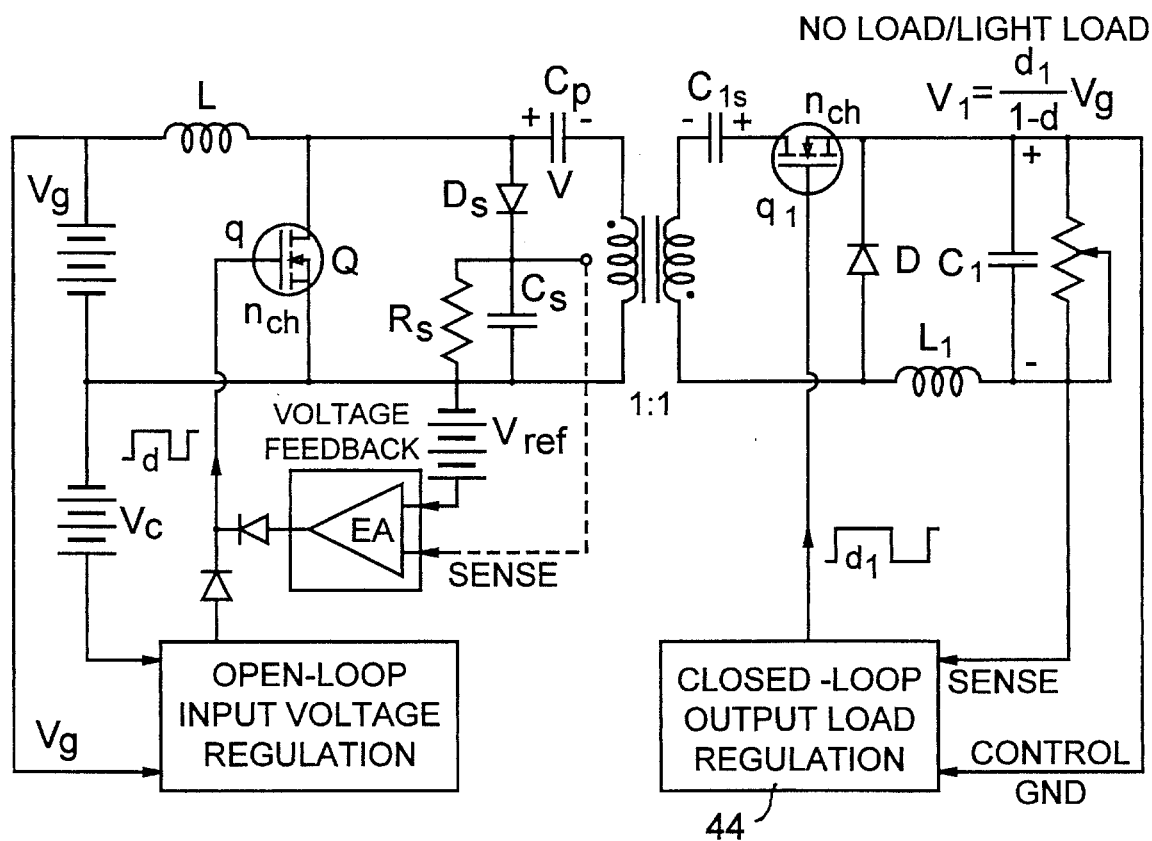
FIG. 18 is a schematic of a fifth embodiment of the present invention in which another closed-loop feedback is added to the primary side in addition to the open-loop control in order to limit the voltage increase of the primary side active switch Q to the desired value after the converter primary goes into DICM mode (auxiliary circuit is disconnected). Another option allows both controls to be active at all times with different weighting factor.
Figure 19A:
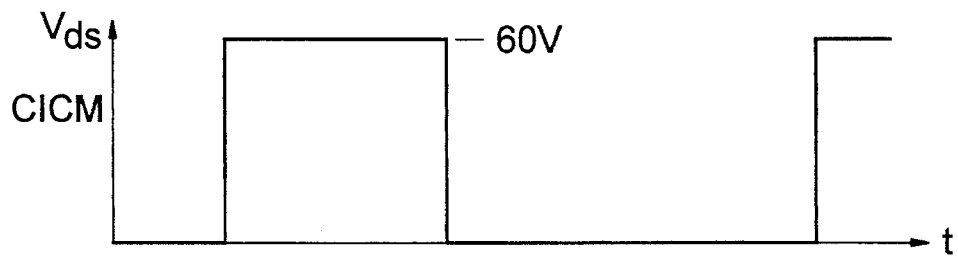
FIGS. 19a and 19b depict the OFF voltage of transistor Q FIG. 18 in CICM mode and in DICM mode, respectively.
Figure 19B:
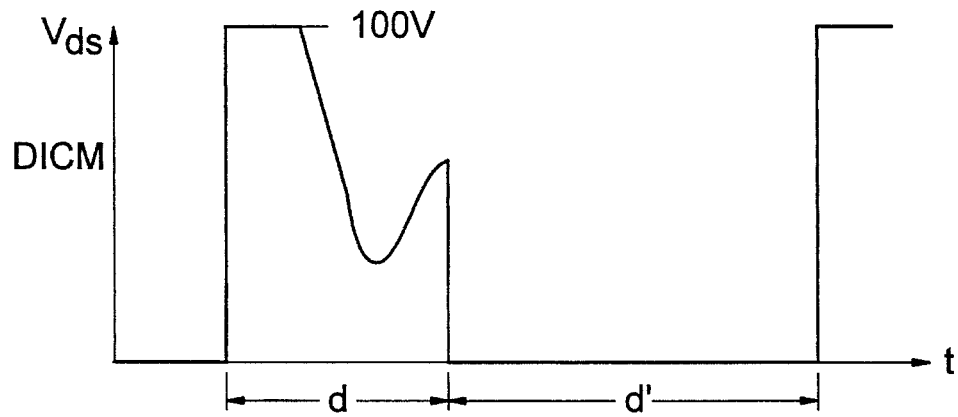

The present invention provides also for several alternative primary side control strategies when the rectifier diode is used on the secondary side as in FIG. 18, thus leading to the discontinuous conduction mode at the light and no load. Note that at light load, the primary boost-like converter is operated in the discontinuous conduction mode. Due to the higher voltage gain in this mode, the primary switch OFF voltage (which was constant and regulated, for example to, 60 V while in CICM mode) will start to rise at lighter load and lead to higher and higher OFF voltages such as 100 V as shown earlier in FIG. 10b. This runaway rise of the voltage at no load and at very light load has to be prevented. To accomplish that, another variant of the present invention is shown in FIG. 18. The Q switch OFF voltage is regulated as before in CICM mode by the open-loop control law of equation (3). As shown in FIG. 18, an additional voltage feedback sensing means for the transistor OFF voltage via snubber circuit $D_s$, $C_s$, and $R_s$ is used as shown in FIG. 18 to limit this voltage. By choosing the reference voltage $V_{ref}$ for this voltage feedback loop appropriately, one can set this clamped voltage to any desired level above 60 V, as shown in FIGS. 19a and 19b. The practical circuit used for verification of this control scheme limited this voltage to 70 V resulting in the characteristic of FIG. 10b. Thus, the converter operation is as follows. In CICM mode shown in FIG. 19a, the voltage never exceeds 60 V, therefore the voltage feedback is not operating and open-loop control is employed. At light load, that is in DICM mode shown in FIG. 19b, the voltage feedback will take over at a certain load and prevent further reduction of duty ratio insuring that the OFF voltage of the device never exceeds the set voltage level of 70 V. Of course, the dynamics on the primary side for these load currents will be worse due to the feedback. Another variant of this control scheme could also be utilized. This variant combines the open-loop control strategy with the weak voltage feedback which is employed for all loads. Thus, the open-loop control will do most of the regulation in CICM mode with the voltage feedback "fine tuning" the OFF voltage. The advantage of this circuit is that there is no step in the OFF voltage when the primary side transfers from CICM to DICM mode. On the other hand, the problems with closing the loop will be present in both DICM and CICM mode and weak voltage feedback will be present for all loads.

Figure 20A:
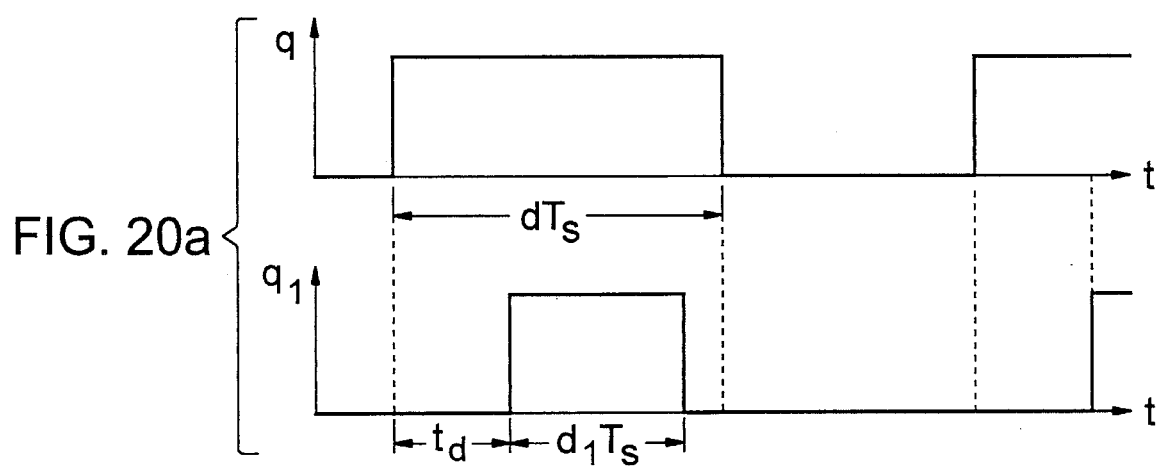
FIGS. 20a and 20b serve to explain the start-up problem due to the finite delays in the synchronization circuit of the secondary side IC regulator chips, which are coupled to the DICM mode of operation of the primary side at light loads and no loads, as well as at start-up which is if the transistor Q shuts OFF before the transistor $Q_1$ has turned ON, as shown in FIG. 20b, the converter never starts.
Figure 20B:
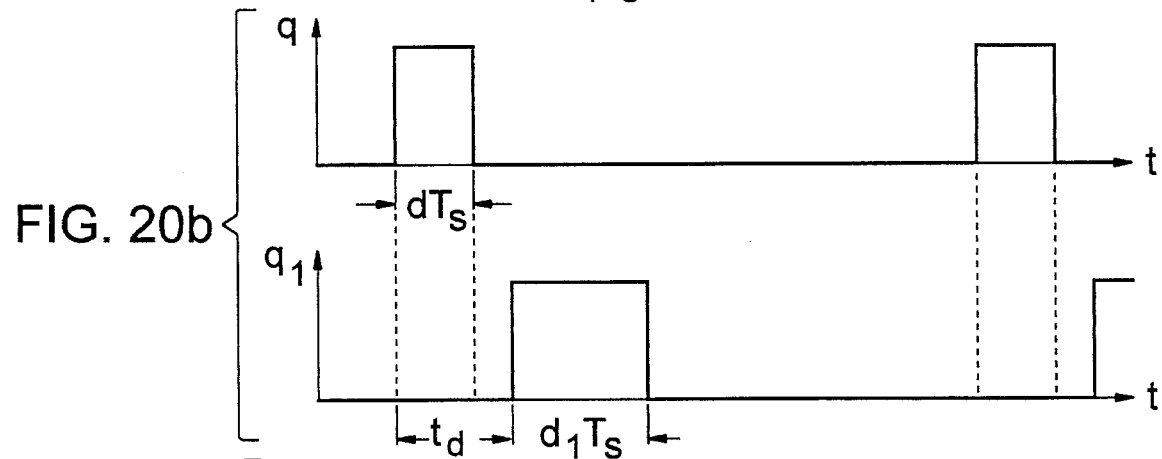

The presence of the voltage feedback on the primary side and the light load condition on the secondary side are also observed experimentally to cause a latch-up condition which can prevent the converter of FIG. 18 to even start up. The synchronization signal for the secondary side IC regulator chip can be obtained directly from the secondary side as explained hereinbefore. Note that this makes the secondary side IC regulator chip synchronized to the primary side since the primary side is also used to start the converter. Ideally, $Q_1$ and $Q_2$ in FIG. 18 should be turned ON at the same time. However, in practice, there will inevitably be some delay $t_d$ after turn ON of transistor Q before transistor $Q_1$ on the secondary side is also turned ON as shown in FIG. 20a. However, because of the delay in the circuit, if the secondary PWM chip is synchronized to the turning ON of $Q_1$, there will be a delay of approximately 0.4 microseconds before $Q_1$ turns ON as shown in FIG. 20b. This rather large delay is due to the internal property of some IC regulator chips, such as Unitrode UC 3843 used in the experiments. Although the magnitude of this delay could be reduced by employing other faster and more complex IC regulator chips, such as Unitrode UC 3825, the delay problem still exists and requires a fundamental solution because if the switching frequency is substantially increased, even the faster UC 3825 chip could encounter the same delay problem.

The problem occurs at the start up when this relatively long delay is coupled with the light load (DICM) operation of the converter and primary side voltage feedback loop. At light load, the primary side is operating in discontinuous conduction mode, which forces the duty ratio of Q to be very small as shown in FIG. 20b. If this time is smaller than the delay time, transistor Q will turn OFF before transistor Q1 on the secondary side has a chance to turn ON as shown in FIG. 20b. Thus, there will be no overlap conduction of transistors Q and $Q_1$. However, it is only during the time interval when both Q and $Q_1$ are turned ON (capacitor discharge interval) that the energy and the power is transferred from the input to the output. Thus, the output will drop out of regulation and the converter will never start again. Even increasing the output load will not pull the converter back into a continuous conduction mode and operation at higher duty ratios since the output secondary side current is never seen by the input primary side circuit, which continues to operate at the DCM mode. Thus, a latch-up condition occurs and the converter will not start up.

Figure 21A:
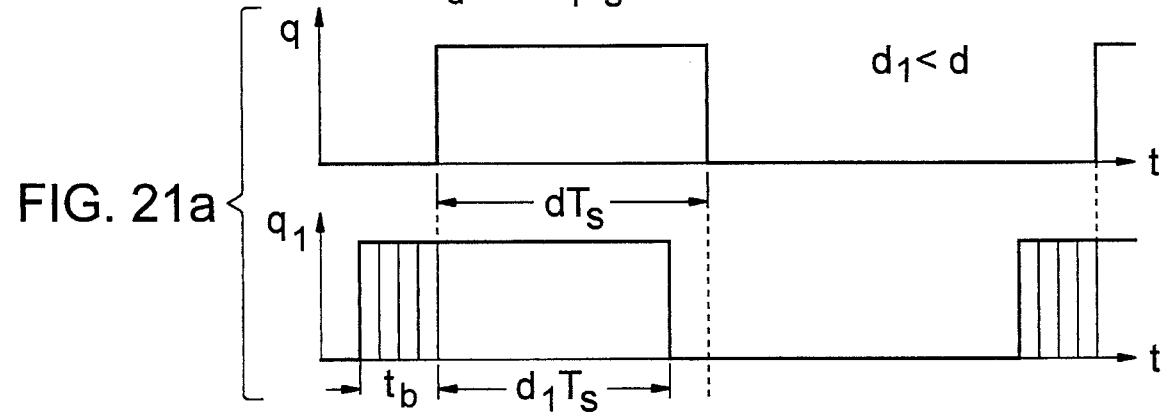
FIGS. 21a and 21b depict the solution to the start-up problem of FIG. 20b, which is to delay the synch on the secondary side for 80% of cycle time and thereby turning transistor $Q_1$ ON before transistor Q has turned OFF.
Figure 21B:
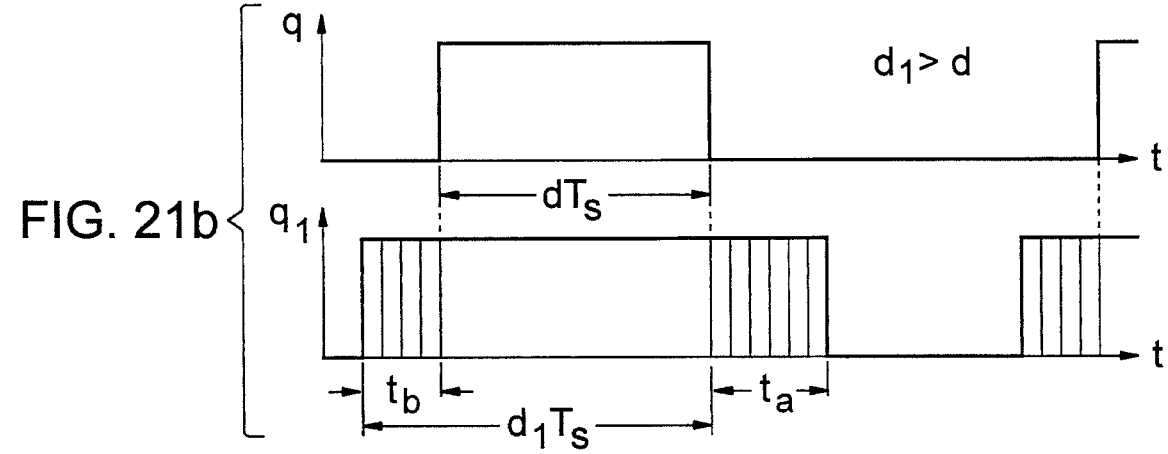
Figure 22:
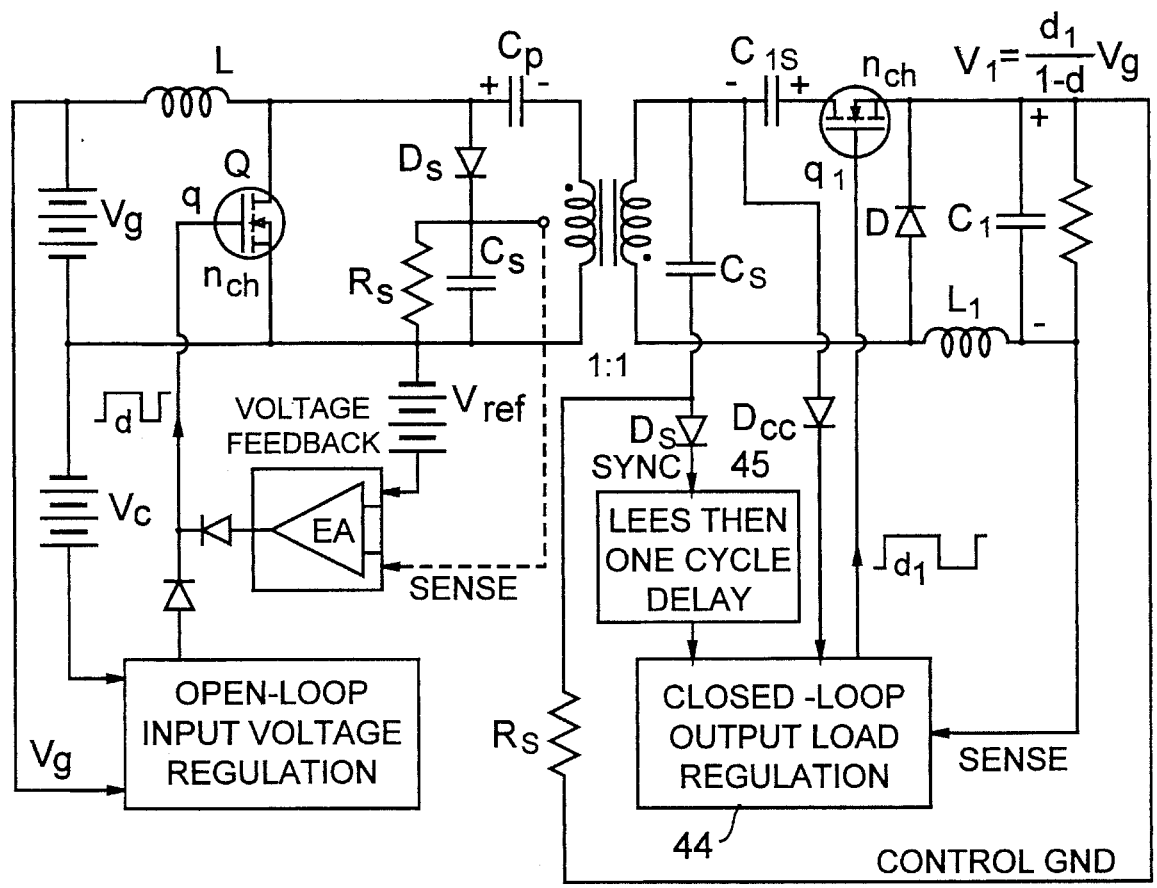
FIG. 22 illustrates a practical resolution of the start-up problem by delaying the secondary synch signal for slightly less than one cycle time. This allows even IC regulators with a long delay time to be effectively used and synchronized to the primary control circuit.

A simple solution to the start up and synchronization problems is found if the converter operation is analyzed in more detail. Despite the two independent active devices, the input active device Q dominates the output active device $Q_1$ in its affect upon output voltage control. Therefore, as shown by the shaded area in FIG. 21a, the secondary side MOSFET $Q_1$ could be turned on for interval $t_b$ before the primary side switch Q without having any effect on circuit operation during that interval the body diode of $Q_1$ is conducting whether $Q_1$ is turned ON or OFF. Similarly, the secondary switch $Q_1$, could be turned on for any period after the primary switch Q has turned OFF as shown by the shaded area in FIG. 21b. Note that the effective duty ratio d1 controlling the output voltage is not the period that $Q_1$ is ON but actually only the overlapping conduction time of the two active switches. Thus, turning ON $Q_1$ before Q has been turned ON will have the same effect as turning ON both Q and $Q_1$ at the same time. Using this observation, the sync signal can be delayed for about 80% of the switching cycle as shown in FIG. 21b to force $Q_1$ to turn ON the very next cycle before the transistor Q has turned ON. The net result is that the overlapping conduction of the two devices has been established despite the low duty ratio d of the input active switch at the light load operation. The turn OFF of the output active switch and determination of the duty ratio $d_1$ is then dictated by the secondary side IC regulator circuitry. The practical implementation of the sync delay circuit 45 in FIG. 22 utilizes a one-shot circuit which delays the sync pulse by 5 microseconds. The delayed sync signal triggers the PWM clock of the secondary side IC regulator chip 44 and at the same time synchronizes its operation to the primary side. This circuit addition, therefore, makes the converter operation completely insensitive to the turn ON delay of the $Q_2$ transistor and the infidelity of the IC regulator chips with their long internal delay time.

Figure 23:
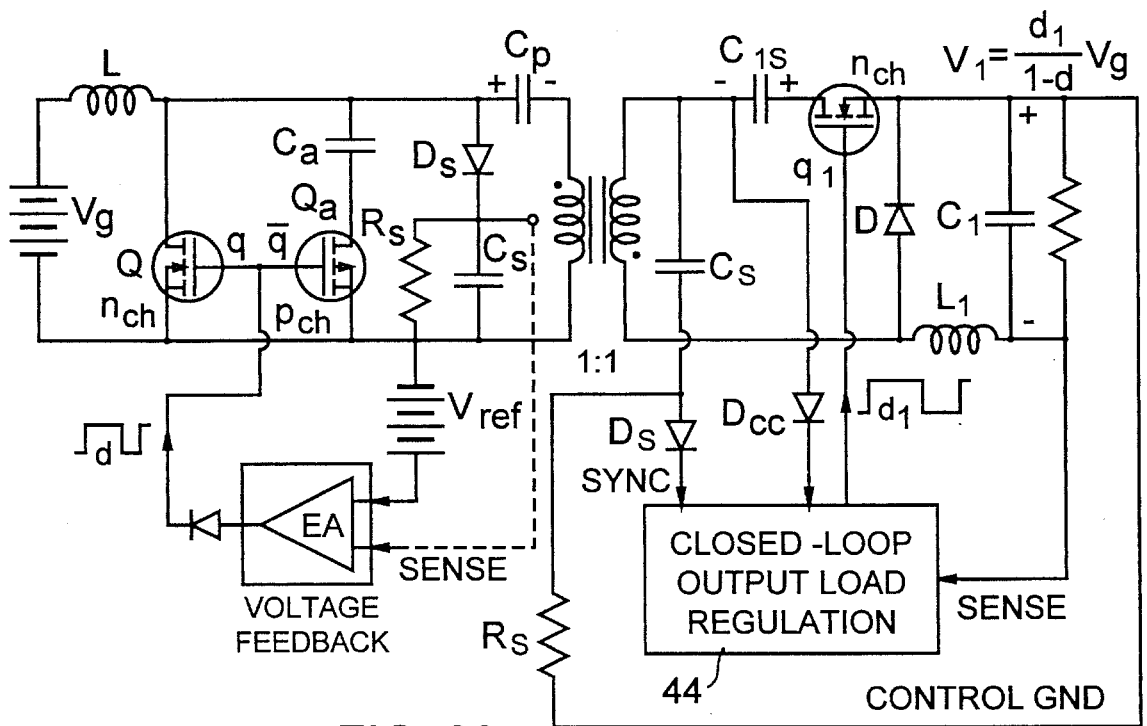
FIG. 23 illustrates how the presence of auxiliary circuit $Q_a$, $C_a$ eliminates the need for the delay circuit in the secondary, even when only the closed-loop voltage regulation on the primary side is employed.

In another variant of the present invention, only the closed-loop regulation of the input voltage is retained as shown in FIG. 23. However, the auxiliary circuit $Q_a$, $C_a$ is added on the primary. Thus, once again, the DICM mode is prevented by the auxiliary circuit and the one cycle delay circuit 45 is not longer necessary in the converter shown in FIG. 23.

OTHER EMBODIMENTS

Figure 24:
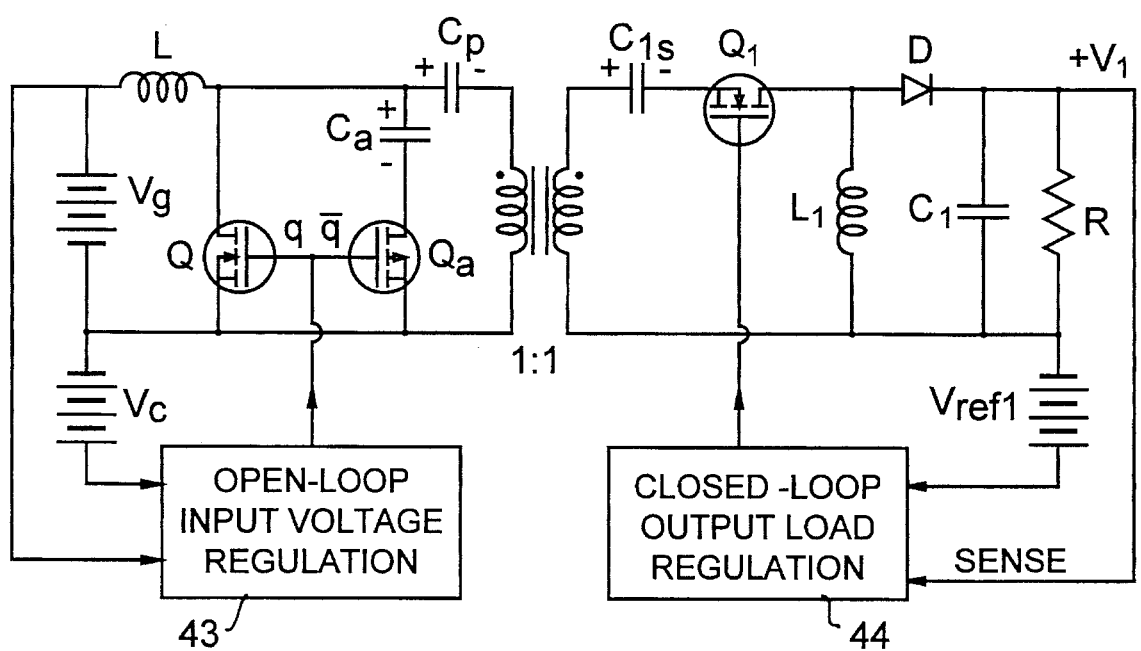
FIG. 24 is another example of a switching converter satisfying the principles outlined in the first preferred embodiment of FIG. 6 and thus operating with similar benefits of open-loop regulation on the primary side with the addition of the auxiliary circuit $Q_a$, $C_a$.

The present invention can be also practiced in other capacitive idling switching configurations which satisfy the criteria outline for the first preferred embodiment of FIG. 6. One such example is the isolated switching converter of FIG. 24.

EXPERIMENTAL VERIFICATION

The experimental prototype of a three output, 250 W converter (5 V@20 A, 15 V@6 A, −15 V@4 A) operating from rectified AC line (200 V to 400 V) was built using both closed-loop (FIG. 23) and open-loop (FIG. 12) control strategy for input voltage regulation and the results are compared. The additional outputs are generated by simply repeating the secondary side of FIG. 23 and FIG. 12 two more times and appropriately scaling transformer turns ratio for additional +15 V and −15 V outputs.

First the input voltage regulation characteristic with open-loop control of the boost-like front-end was tested by placing a load from the test point on the primary side to ground. The voltage measured across the load was actually the OFF voltage of Q. The input voltage variations from 200 V to 400 V resulted in less than 1.9% line regulation, while the load current variations from 1.5% to 100% resulted in less than 3% load regulation, for a combined line/load regulation of around 3.3%. Note also that the load current was not allowed to go to zero (no load condition). After passing through the secondary side buck converter the overall line/load and crossregulation of each of the three outputs was under the worst case combination better than 0.04%.

Figure 25:
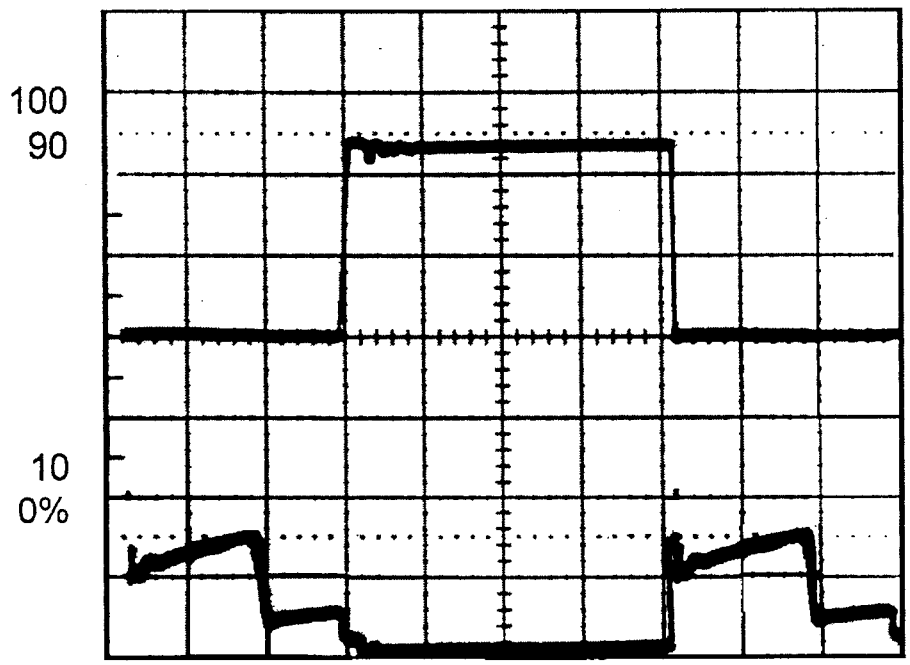
FIG. 25 represents the measurement data obtained on an experimental 150 kHz, 250 W multiple output prototype with the current waveform of the primary side main switch $V_{DS}$ shown as the top trace at 200 V/div., while diode current $I_D$ is shown as the bottom trace at 2 A/div. with time scale of 1 μsec/div.

The input switch current waveform is shown in FIG. 25. Note the peculiar two slope characteristic even with only one output loaded. During first $d_1T_s$ (Q and $Q_1$ both ON) period, the switch conducts higher current (sum of the input and reflected output current). When transistor $Q_1$ turns OFF for remaining interval $(d-d_1)T_s$, the switch conducts input current only, thus smaller magnitude in switch current and different slope. Clearly, this excludes the use of the peak current-mode programming of the input switch to improve frequency response. For closed-loop input voltage regulation (FIG. 23), this severely limits the bandwidth for the line transients. Each output is also individually protected against the short circuit or overload current conditions.

Figure 26:
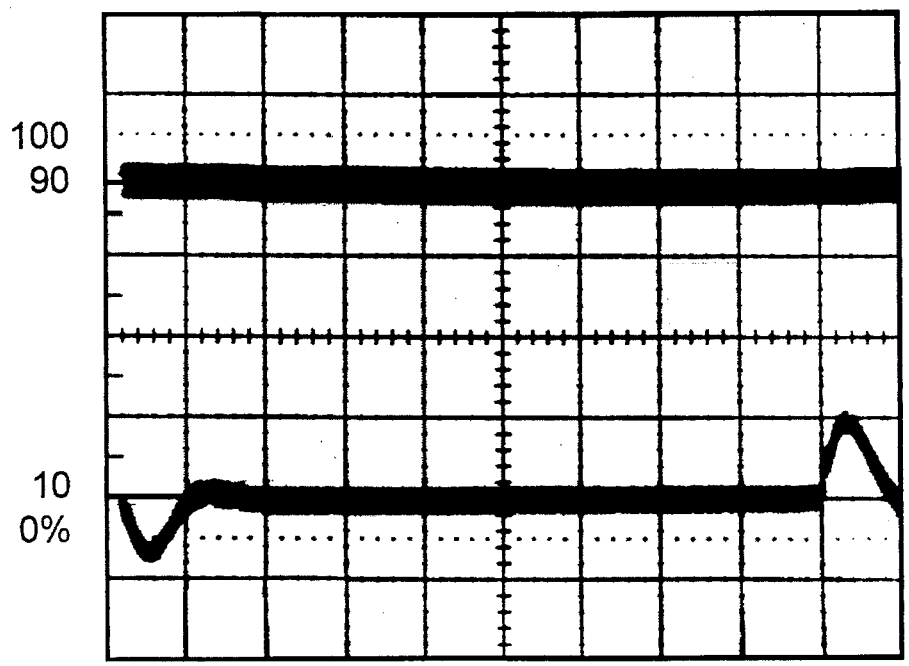
FIG. 26 represents the output voltage response to the 10 A step-load current change on 5 V output with 15 V output as top trace at 0.1 V/div. and 5 V output as the bottom trace at 0.2 V/div. and time scale of 20 μsec/div.

On the other hand, the open-loop control (FIG. 12), is not at all effected by it. In fact, the excellent open-loop regulation of the front boost-like converter, makes the output buck converter operate with the pre-regulated voltage and effectively completely decouples its dynamics from the front boost-like converter. Thus, it is not surprising that the output load regulation feedback loops have each easily achieved 26 kHz bandwidth (for a 150 kHz switching frequency) with a 60 degree phase margin since current-mode programming can be applied to output stages. As shown in FIG. 26, 10 A load current change on 5 V yields 200 mV transient and recovers extremely fast in about 15 μs, or two switching cycles. Note also from the first trace in FIG. 26 for 15 V output, that there is essentially no crosstalk and effect on other outputs. The audio susceptibility test also shows a truly remarkable performance. Despite a huge 100 V sine wave excitation added to the input (normal tests call for only 2 V magnitude), the output voltage variation of only 20 mV (−74 dB) at 1.5 kHz test frequency is obtained. This is more than 100 times lower than the best test with the conventional converters. It is also clear that the reverse rejection characteristic, that is load current modulation and its reflection on the input current side (so called TEMPEST characteristic for Mil.spec. supplies) is equally good.

Finally, the overall efficiency, including the housekeeping supply and drive, was measured at 85%. The hybridized 250 W, 150 kHz module is being packaged into a standard SEM-E board format approaching 20 W per cubic inches power density and including complex control, protection, and monitoring circuitry.

| Load [A] | Input Voltage Vg[V] | | | | | |
|---|---|---|---|---|---|---|
| | 150 | 200 | 300 | 400 | 550 | 200–400 V |
| 0.000 | 610 | 596 | 594 | 596 | 601 | 0.25 |
| 0.002 | 599 | 587 | 586 | 588 | 593 | 0.35 |
| 0.010 | 595 | 585 | 584 | 586 | 590 | 0.39 |
| 0.050 | 583 | 578 | 580 | 584 | 588 | 1.00 |
| 0.100 | 570 | 573 | 576 | 581 | 587 | 1.40 |
| 0.120 | 566 | 569 | 574 | 580 | 587 | 1.90 |
| 0.002–0.12A | 5.7 | 3.1 | 2.0 | 1.4 | 1.0 | $\Delta V_{out}[\%]$ |

Line and load regulation of the primary side of the experimental prototype

We claim:

1. A switching converter with an open-loop nonisolated input voltage regulator and a closed-loop nonisolated output voltage regulator comprising an isolated power processing stage and said nonisolated input and output voltage regulators, one on each side of an isolation transformer in said power processing stage, with said nonisolated input voltage regulator on the primary side of said transformer regulating against input voltage changes in an open-loop control mode and said nonisolated output voltage regulator on the secondary side of said transformer regulating against load current changes as well as any voltage variations in a closed-loop control mode, said isolated power processing stage comprising a dc voltage source in series with an input inductor, an input energy transfer capacitor and the primary winding of said isolation transformer in that sequence and a main current bidirectional switch connecting a junction between said input inductor and input energy transfer capacitor to the return current path of said primary winding to said dc voltage source, and an auxiliary circuit comprising an auxiliary current bidirectional switch and capacitor in series, said auxiliary circuit being connected in parallel with said main current bidirectional switch, and switching means for driving said main current bidirectional switch and said auxiliary current bidirectional switch out-of-phase such that when either one is turned ON the other is OFF turned off, a secondary circuit comprising an output energy transfer capacitor, a series current bidirectional switch, a load and filter capacitor in parallel, and an output inductor in series in that order with the secondary winding of said isolation transformer, and a rectifier diode connecting a junction between said series current bidirectional switch and said load to a junction between said output inductor and said secondary winding of said isolation transformer, and means for synchronizing cyclical operation of said nonisolated output voltage regulator controlling said current bidirectional switch of said secondary circuit with a fixed cyclical rate of said open-loop nonisolated input voltage regulator thereby to provide drive signals to turn ON said main and said auxiliary current bidirectional switches and turn ON said current bidirectional switch of said secondary circuit, and to turn OFF both said main and said auxiliary current bidirectional switches as dictated by said open-loop nonisolated input voltage regulator and to turn OFF said current bidirectional switch of said secondary circuit as dictated by said closed-loop nonisolated output voltage regulator.

2. A switching converter as defined in claim 1 wherein said auxiliary circuit comprising said auxiliary current bidirectional switch and capacitor in series synchronously switch with said main current bidirectional switch thereby to assure that the circuit on the primary side of said isolation transformer operates always in a continuous inductor current mode over a wide range including light loads and no loads, and wherein implementation of said open-loop nonisolated voltage regulator of input voltage is made with a pulse width modulator comprising means for comparing sensed input voltage $V_g$ from said source with a down-going cyclical ramp reference voltage having a desired constant peak voltage $V_c$ and slope thereby transmitting a pulse-width modulated control output signal with a pulse duty ratio $d=1-V_g/V_c$ during each ramp cycle.

3. A switching converter as defined in claim 1 wherein said auxiliary circuit comprising said auxiliary current bidirectional switch and capacitor in series synchronously switch with said main current bidirectional switch to thereby assure that the circuit on the primary side of said isolation transformer operates always in a continuous inductor current mode over a wide range including light loads and no loads, and wherein implementation of said open-loop nonisolated voltage regulator of input voltage is made with a first means for comparing sensed input voltage $V_g$ from said source with a desired constant reference voltage $V_c$ to produce a difference voltage $V_a$ and a second means for comparing said difference voltage $V_a$ with an up-going cyclical ramp voltage having a constant peak voltage $V_c$ and slope for transmitting a pulse-width modulated control output signal with a duty ratio $d=1-V_g/V_c$.

4. A switching converter as defined in claim 3 wherein said desired constant reference voltage $V_c$ is scaled from a fixed reference voltage $V_{ref}$ multiplied by a multiplier m and said sensed input voltage $V_g$ is also multiplied by the same multiplier m before comparison by said first means for comparing.

5. A switching converter as defined in claim 1 wherein all of said current bidirectional switches are implemented with MOSFET transistors and said main and auxiliary current bidirectional switches are of opposite n-channel and p-channel conductivity type for out-of-phase control by a single bipolar voltage drive pulse-width modulated signal from said nonisolated input voltage regulator, thus protecting against overlapping conduction of both MOSFET transistors.

6. A switching converter as defined in claim 5 including a second rectifier diode connecting a junction between said output energy transfer capacitor and said current bidirectional switch in the secondary side of said isolation transformer to a junction in the return current path of said load between said output inductor and said secondary winding of said isolation transformer thereby to increase efficiency.

7. A switching converter as defined in claim 5 wherein said means for synchronizing said nonisolated output voltage regulator with a cyclical rate of said open-loop nonisolated input voltage regulator to turn ON said current bidirectional switch of said secondary circuit when said main and auxiliary current bidirectional switches are turned as dictated by said cyclical rate of said open-loop nonisolated input voltage regulator comprises a voltage differentiating synchronization circuit consisting of a differentiator capacitor and resistor connected in series in that order from a junction between said secondary winding of said isolation transformer and said output energy transfer capacitor to a voltage control circuit ground and a rectifier diode connected from a junction between said differentiator capacitor and resistor, and said rectifier diode being poled to pass sharp spike pulses derived by differentiating the leading edge of square-wave pulse-width modulated pulses coupled by said isolation transformer from its primary side to its secondary side thereof, thereby timing said closed-loop output load regulator to turn ON said current bidirectional switch on the secondary side of said isolation transformer when said main current bidirectional switch on the primary side of said isolation transformer is turned ON.

8. A switching converter as defined in claim 7 including means for delaying said sharp spike pulses a period less than one cycle to force said current bidirectional switch in said secondary circuit to turn ON the very next cycle before said main current bidirectional switch is turned ON.

9. A switching converter as defined in claim 7 for multiple loads, where at least one secondary circuit is added for converting power from said single primary circuit to an independent load, each added secondary circuit having a separate closed-loop nonisolated output voltage regulator and sharing with each added secondary circuit said voltage differentiating synchronization circuit.

10. A switching converter as defined in claim 5 wherein said rectifier diode connecting a junction between said series current bidirectional switch and said load to a junction between said output inductor and said secondary winding of said isolation transformer is implemented with a synchronous MOSFET rectifier controlled out-of-phase with respect to said main bidirectional switch in the primary side of said isolation transformer such that while the latter is ON the former if OFF and vice versa.

11. A switching converter as defined in claim 1 wherein said current bidirectional switch in said secondary circuit is driven by a direct nonisolated drive connection by said nonisolated output voltage regulator.

12. A switching converter as defined in claim 1 wherein power needed to power up said closed-loop nonisolated output voltage regulator is derived by a diode rectifier connected from said junction between said output energy transfer capacitor and said secondary winding of said isolation transformer to said closed-loop nonisolated output voltage regulator.

13. A switching converter as defined in claim 12 wherein said current bidirectional switch in said secondary circuit is an n-type MOSFET device and said output inductor is connected between the output of said load and said secondary winding of said isolation transformer so that voltage of said closed-loop nonisolated output voltage regulator is sensed at the negative output voltage of said load and filter capacitor in parallel for separation of output power ground from output control ground in order that any noise in the power ground will not interfere with the drive of said n-type MOSFET device.

14. A switching converter as defined in claim 13 wherein said auxiliary circuit in the primary side of said isolation transformer is eliminated.

15. A switching converter as defined in claim 1 wherein said input inductor and isolation transformer are integrated on a common core in order that input ripple current be shifted from the input inductor into said isolation transformer, thus resulting in a near zero input current ripple.

16. A switching converter as defined in claim 1 wherein multiple secondary circuits are provided for multiple output dc voltages and the transformer turns ratios are chosen for each to match the ratio of the multiple output dc voltages for separate loads and wherein the output inductors of all secondary circuits are integrated on a common core for near zero ripple current in all but one voltage output.

17. A switching converter as defined in claim 1 including input voltage regulation feedback for the switch-OFF voltage of said main bidirectional current switch in addition to regulation by said open loop nonisolated voltage regulator comprising a pair of buffer diodes connected to the control terminal of said main switch, one coupling said open loop nonisolated voltage regulator to drive said main current bidirectional switch, a clamping diode connected in series with a resistor to the return current path of said primary side of said transformer to said dc voltage source and a capacitor in parallel with said resistor, said diode of said diode and resistor series circuit being connected to a junction between said energy transfer capacitor and said main current bidirectional switch, means for sensing voltage at a junction between said diode of said series resistor, and means responsive to said sensed voltage for producing a feedback voltage to a second one of said pair of buffer diodes that exceeds a reference voltage, where said reference voltage is a level above CICM mode voltage under normal load, so that voltage feedback is produced only during DICM mode at light load, whereby voltage feedback control will take over control of said main switch at a certain load and prevent further reduction of duty ratio of said main current bidirectional switch.

* * * * *